United States Patent [19]
Hammer

[11] Patent Number: 6,076,619
[45] Date of Patent: Jun. 20, 2000

[54] ALL TERRAIN VEHICLE FOR DISABLED PERSONS

[76] Inventor: Adolph Hammer, 41 Baretich Rd., Aberdeen, Wash. 98520

[21] Appl. No.: 09/209,652

[22] Filed: Dec. 10, 1998

[51] Int. Cl.[7] .................................................. B62D 11/00
[52] U.S. Cl. ......................................... 180/6.48; 180/9.26
[58] Field of Search ................................... 180/9.1, 9.21, 180/9.26, 9.28, 9.3, 9.34, 9.36, 9.38, 6.48, 6.5

[56] References Cited

U.S. PATENT DOCUMENTS

| | | | |
|---|---|---|---|
| 2,592,023 | 4/1952 | Gleason | 180/9.1 |
| 3,638,745 | 2/1972 | Floyd . | |
| 4,077,483 | 3/1978 | Randolph | 180/6.5 |
| 4,475,613 | 10/1984 | Walker . | |
| 4,674,584 | 6/1987 | Watkins . | |
| 4,773,494 | 9/1988 | Anderson . | |
| 4,893,687 | 1/1990 | Simmons | 180/9.1 |
| 4,898,508 | 2/1990 | Hayata . | |
| 4,955,451 | 9/1990 | Schaefer . | |
| 5,123,495 | 6/1992 | Littlejohn et al. | 180/9.32 |
| 5,158,150 | 10/1992 | Askeland . | |
| 5,343,960 | 9/1994 | Gilbert | 172/823 |
| 5,395,129 | 3/1995 | Kao . | |
| 5,577,567 | 11/1996 | Johnson et al. | 180/9.32 |
| 5,641,030 | 6/1997 | Toselli | 180/9.32 |

OTHER PUBLICATIONS

Mountain Wheelchair by HANDI TRAK, searchable on the Internet.

Primary Examiner—J. J. Swann
Assistant Examiner—J. Allen Shriver
Attorney, Agent, or Firm—Brian J. Coyne; Miles Way Coyne, PLLC

[57] ABSTRACT

A self-powered, all terrain vehicle designed for self-assisted transfers of a paraplegic, or other disabled person, between the vehicle and a wheelchair. A longitudinally extended vehicle underframe is carried between two track mechanisms. Each track mechanism has an endless belt about the same and about pivotally mounted idler wheels and a rear drive sprocket in driving engagement with the belt. Each drive sprocket is driven by a hydraulic motor powered by a hydraulic pump coupled to an internal combustion engine. Height adjustable motor mounts permit adjusting the tension in each belt. A seat assembly carried by the underframe provides a passenger seating surface that extends laterally outward over the track mechanisms to minimize the lateral distance a wheelchair-bound passenger must heave his body to mount and dismount the vehicle. To achieve a narrow vehicle profile for ease of passenger entry and exit, the engine and hydraulic drive system components are disposed longitudinally, and the hydraulic fluid tank comprises two wing tank portions disposed under side portions of the seating surface and joined by a rear tank portion mounted behind the seating assembly. An air bladder seat suspension system aids passenger comfort and permits adjusting the longitudinal attitude of the seating surface. Passenger safety restraints include a pair of leg rests, and seat and shoulder belts. A steerable auxiliary wheel system is provided for rolling the vehicle on auxiliary wheels in the event the vehicle becomes inoperable.

22 Claims, 24 Drawing Sheets

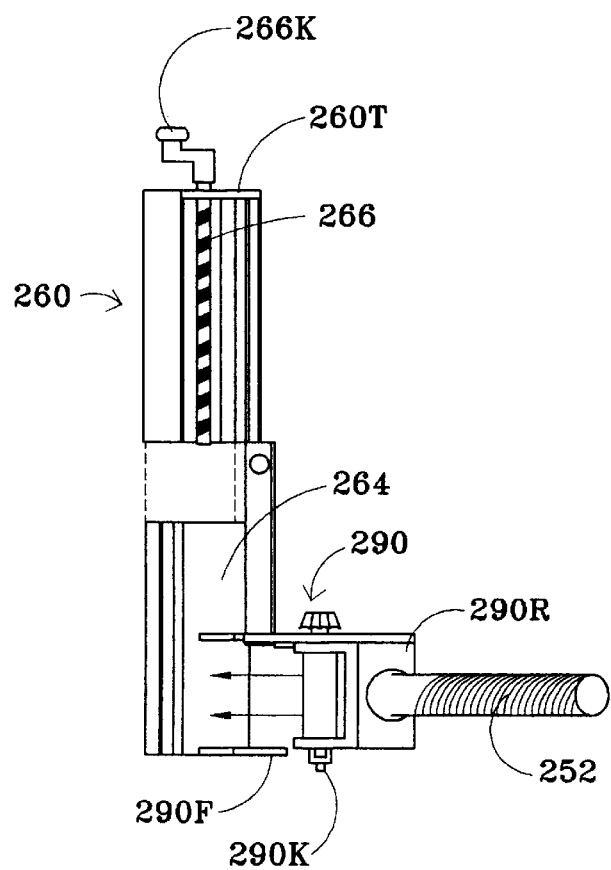
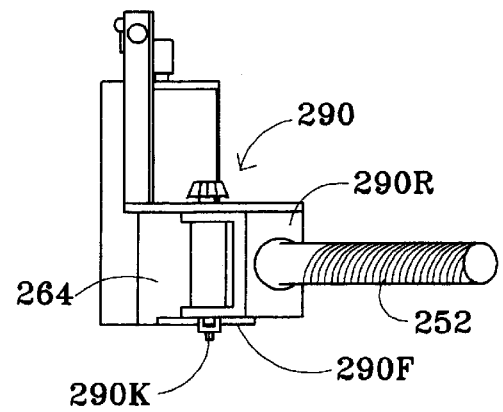
FIG. 20A
FIG. 20B

ALL TERRAIN VEHICLE FOR DISABLED PERSONS

CROSS REFERENCE TO RELATED APPLICATIONS

Not applicable.

STATEMENT REGARDING FEDERALLY APPROVED RESEARCH OR DEVELOPMENT

Not applicable.

BACKGROUND OF THE INVENTION

1. Field of the Invention

This invention relates to small, self-propelled vehicles that may be used by the infirm, disabled or aged, and particularly to a personal, all-terrain vehicle for transporting a paraplegic.

2. Background Art

Self-propelled wheelchairs have been used by aged and infirm persons for personal transportation, commonly powered by an electric battery and motor, but an internal combustion engine powered version was also disclosed by Walker, U.S. Pat. No. 4,475,613. Wheelchairs are generally suitable, however, only for locomotion over smooth or paved surfaces. For self-propelled transportation over rough and uneven terrain such as stairs, mountain and forest trails, and gravel roads, vehicles mounted on a pair of tracks or endless belts, and a passenger seat mounted on the vehicle between the tracks, have been developed. See, for example, the tracked stair climbing wheelchair described by Littlejohn, et al., U.S. Pat. No. 5,123,495, and that described by Watkins, U.S. Pat. No. 4,674,584. Such tracked vehicles can be ideal for outdoor use in rugged, hilly terrain because their dual track mechanisms can provide a stable, wide stance, and excellent ability to grip loose and muddy surfaces, and uneven surfaces. Heretofore, however, the task of boarding and unboarding the tracked vehicle has been difficult for wheelchair-bound persons, especially during self-assisted transfers executed by paraplegics. When the wheelchair would be drawn up alongside and parallel to one of the track mechanisms and adjacent the passenger seat of the tracked vehicle, it would be necessary to lift and swing the entire lower body of the paraplegic up and out of the wheelchair, all the way across one track mechanism, and into the passenger seat. Self-assisted transfer from the tracked vehicle back to the wheelchair was equally difficult due to the width of the track mechanisms. Thus, there remains a need for a tracked, stable, self-propelled all-terrain vehicle designed for self-assisted transfers from and to a wheelchair.

SUMMARY OF THE INVENTION

The present invention provides a self-propelled, all-terrain vehicle for self-assisted transfers of a disabled person (e.g., a paraplegic) between the vehicle and a wheelchair, and for transporting the person over a ground surface. The vehicle has a longitudinally elongated underframe carried between left and right tracks mechanisms. Each of the track mechanisms has an endless belt about the mechanism, pivotally mounted idler wheels, and a rear drive sprocket in driving engagement with the belt.

A seat assembly is centrally disposed above and carried by the underframe at a height above the surface substantially equal to the height of the seat of a wheelchair. The seat assembly includes a horizontal seat panel having front and rear edges and left and right side portions joining the front and rear edges. In order to minimize the lateral distance over which a disabled person seated in a wheelchair adjacent one side of the vehicle must swing his body and legs in order to sit in the vehicle, the side portions of the seat panel extend laterally over, and only slightly above, each of the track mechanisms. This arrangement likewise minimizes the distance over which a disabled person seated in the vehicle must swing his body and legs in order to dismount from the vehicle into his wheelchair.

The vehicle is provided with hydraulic drive means, including left and right hydraulic motors coupled to the left and right drive sprockets, each motor supported by a motor mount assembly attached to the underframe. The vehicle is powered by an internal combustion engine mounted on the vehicle, which drives a hydraulic fluid pump. Hydraulic drive control means is provided for initiating and controlling forward, reverse, and turning movements of the vehicle by controlling the flow of pressurized fluid from the pump to the hydraulic motors. In an alternative embodiment, however, the internal combustion engine instead drives a direct current electric generator, the electric power output of which is conducted through a voltage regulator to electric storage batteries. An electric motor wired to the batteries drives the hydraulic fluid pump.

A hydraulic fluid storage tank is provided having left and right wing tank portions under the left and right side portions of the seat panel, respectively, and a rear tank portion disposed adjacent the rear edge of the seat panel and in communication with the wing tank portions. Both the wing tank portions and the rear tank portion are mounted to the seat assembly above the height of the track mechanisms, thereby helping to minimize the distance between the track mechanisms. Preferably, each wing tank portion is substantially triangular in longitudinal cross-section, having a pair of substantially triangular side walls joined by a horizontal top wall, and a forwardly and downwardly sloping bottom wall. One of the wing tank portions is provided with an exit port 159 for delivering hydraulic fluid to the hydraulic drive means; the opposite wing tank portion has a return port for receiving hydraulic fluid from the hydraulic fluid drive means. A fuel tank is mounted on the vehicle and disposed above the rear tank portion of the hydraulic fluid tank. Preferably, the fuel tank is integral with the hydraulic fluid rear tank portion and has a bottom wall that is also a top wall of the rear tank portion.

The vehicle has an underframe, including left and right inner rails, each inner rail having a front end and a rear end. A front cross member joins the inner rail front ends; a rear cross member joins the inner rail rear ends. A rear skid plate is attached to and joins a rear portion of each of the inner rails, and extends forward from the rear cross member to a central portion of the underframe. A horizontal front skid plate is attached to and joins a front portion of each of the inner rails, and extends rearward from the front cross member to the rear plate.

The seat assembly includes left and right pairs of equal-length, spaced-apart vertical seat supports. Each seat support has a lower end attached to the rear plate and an opposite, upper end. The upper ends of the left and right pairs are attached to left and right side portions of the seat frame lateral supports, respectively. The seat assembly further includes an arm rest assembly. The arm rest assembly has left and right pairs of equal-length, spaced-apart vertical arm rest supports. Each arm rest support has a lower end attached to the seat frame and an opposite, upper end. The arm rest assembly further includes left and right, arm rests extending between the left and right pairs of vertical arm rest supports, respectively. At least one of the arm rests is removable to facilitate entry to and exit from the vehicle. The arm rest assembly also includes left and right back supports, each back support having a lower end attached to the seat frame and an opposite free end; a seat cushion that rests upon the seat panel 92; and a back cushion attached to the back supports. Safety restraints are provided, including seat and lap restraint belts, and a pair of removable leg rests.

The motor mount assembly permits adjustment of the height of the hydraulic motors and attached rear sprockets with respect to the underframe, which provides a means for adjusting the tension of the endless belts. Accordingly, the motor mount assembly comprises upstanding, apertured, left and right motor mount lugs attached to a rear portion of the underframe, and left and right motor mounts. Each motor mount includes a lower bracket portion attached to a motor mount lug and has a vertical height adjustment slot. Integral with the lower bracket portion and extending upward therefrom, is an upper bracket portion having first, second and third apertures for receiving the shaft, forward drive port, and reverse drive port of a hydraulic motor, respectively. The upper bracket portion is adapted for supporting a hydraulic motor with the shaft thereof oriented laterally outward of the underframe. Each motor mount further includes a height adjustment bolt inserted through each motor mount lug and through the height adjustment slot of the motor mount attached thereto. Each height adjustment bolt is fitted with a wing nut for securing the motor mount at a desired height. The motor mount assembly also includes a laterally disposed, horizontal tie bar that extends from the lower bracket portion of the right motor mount to the lower bracket portion of the left motor mount and is attached to each lower bracket portion.

Each track mechanism includes an outer rail; the outer rails are attached to opposite sides of the underframe. A large front idler is rotataby mounted between front portions of the each of the outer rails and the underframe; likwise, a large rear idler is rotatably mounted beween rear portions of each of the outer rails and the underframe. Two pairs of longitudinally spaced-apart, small idler wheels are disposed in tandem between central portions of the support members and between each of the large front and rear idler wheels. Means are provided for spring coupling to the outer rails and the underframe each large front idler wheel, each large rear idler wheel, and each pair of small idler wheels.

In an alternative embodiment, the seat panel is eliminated and the seat assembly instead includes a seat suspension system that rests on the seat frame. The seat suspension system includes parallel upper and lower air bladder support plates and a plurality of horizontally spaced-apart, inflatable air bladders resting upon and attached to an upper surface of the lower air bladder support plate, and attached to a lower surface of the upper bladder support plate. A seat cushion rests on the upper air bladder support plate. The longitudinal pitch of the seat cushion can be varied by adjusting the air pressures within the air bladders.

The vehicle is preferably equipped with a steerable, auxiliary wheel system by which the vehicle can be rolled about when the vehicle is otherwise inoperable—due to engine failure, for example. This system includes a removable steering column and steering column support, which are storable separate from the vehicle. When the auxiliary wheel system is to be used, the steering column and steering column support are installed into the vehicle, as follows: an upper end of the steering column, with attached steering wheel, is positioned above the seat surface, and an opposite lower end of the column is positioned above the front cross member. The steering column support is attached to the seat assembly and in supporting engagement with the steering column intermediate the upper and lower ends of the column. The auxiliary wheel system also includes left and right rear wheel assemblies attached to the rear portions of the left and right rails, and left and right front wheel assemblies attached to front portions of the left and right rails, respectively. Each of the wheel assemblies has auxiliary wheels that are height adjustable between an upper, retracted position and a lower, surface-engaging position. A steering linkage means is attached to a lower, front portion of the vehicle for imparting pivotal motions to each of the front auxiliary wheels about a vertical axis through a central portion of each of the auxiliary wheels in response to rotational motions of the steering wheel.

Important objectives of the present invention therefore include the following:

It is an object of the invention to provide a self-propelled, all-terrain vehicle, comprising a longitudinally elongated underframe carried between left and right track mechanisms, for self-assisted transfers of a disabled person between the vehicle and a wheelchair, and for transporting the person over a surface.

It is another object of the invention to power such a vehicle with an internal combustion engine driving a hydraulic pump, the pump being connected by hydraulic conduit to a hydraulic drive system controlled by hydraulic drive control means.

It is a further object of the invention to provide such a vehicle wherein the overall width of the vehicle is minimized by placing the seat and wing tank portions of the hydraulic fluid tank partially over the track mechanisms instead of between the track mechanisms, and wherein the height of the vehicle seat approximates the height of a wheelchair seat, thereby reducing the effort that would otherwise be required for a disabled person, such as a paraplegic, seated in a wheelchair drawn up alongside the vehicle, to swing his body and legs out of the wheelchair and up into a seat on the vehicle, and thereafter, to swing his legs and body out of the vehicle to return to said wheelchair, all without any assistance.

Another object of the invention is to provide such a vehicle with motor mount assemblies that permit adjustment of the tension in the endless belt of each of the track mechanisms.

It is still another object of the invention to provide such a vehicle with an air bladder seat suspension system, both for comfort and to permit adjustment of the longitudinal attitude of the seat.

Further objects of the invention are to provide such a vehicle with a removable, steerable auxiliary wheel system that facilitates moving the vehicle whenever the vehicle becomes inoperable, and with a spring suspension system for the track mechanism for a smoother, more controlled ride.

BRIEF DESCRIPTION OF THE DRAWINGS

FIG. 20A shows a knuckle joint being inserted into a front wheel height adjustment block thereof; and FIG. 20B shows the same block after insertion and attachment of the knuckle joint.

Figure 1:
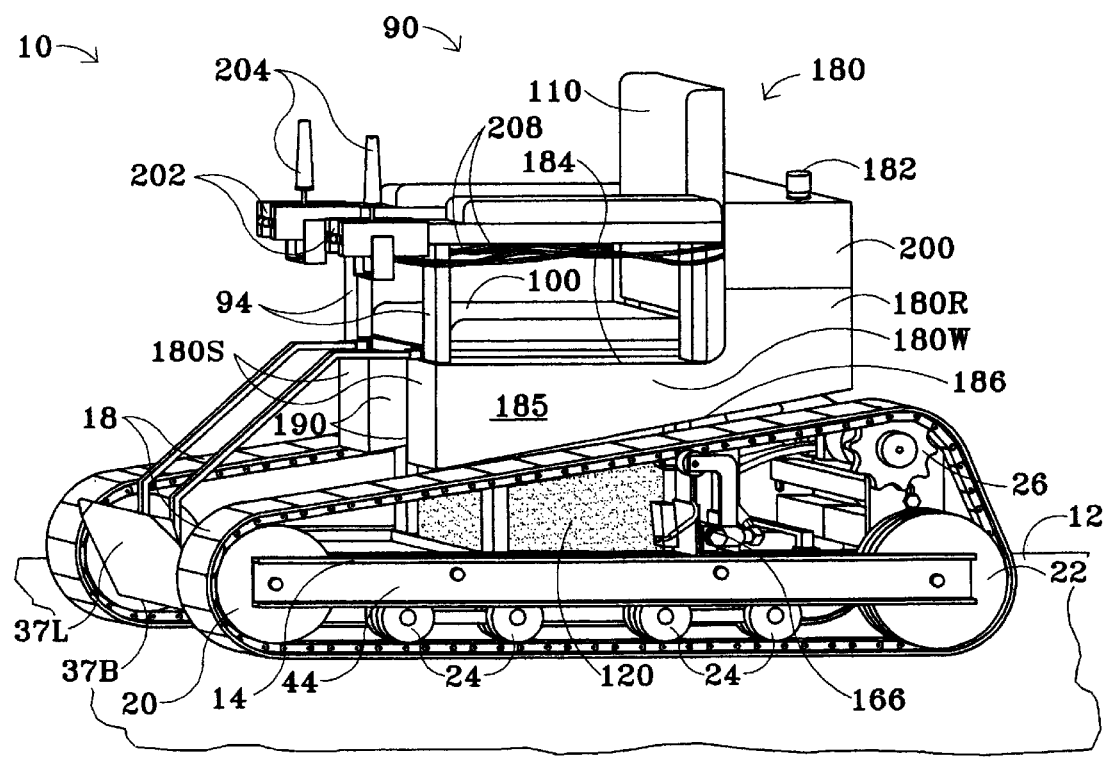
FIG. 1 is a left side perspective view of my vehicle.
Figure 2:
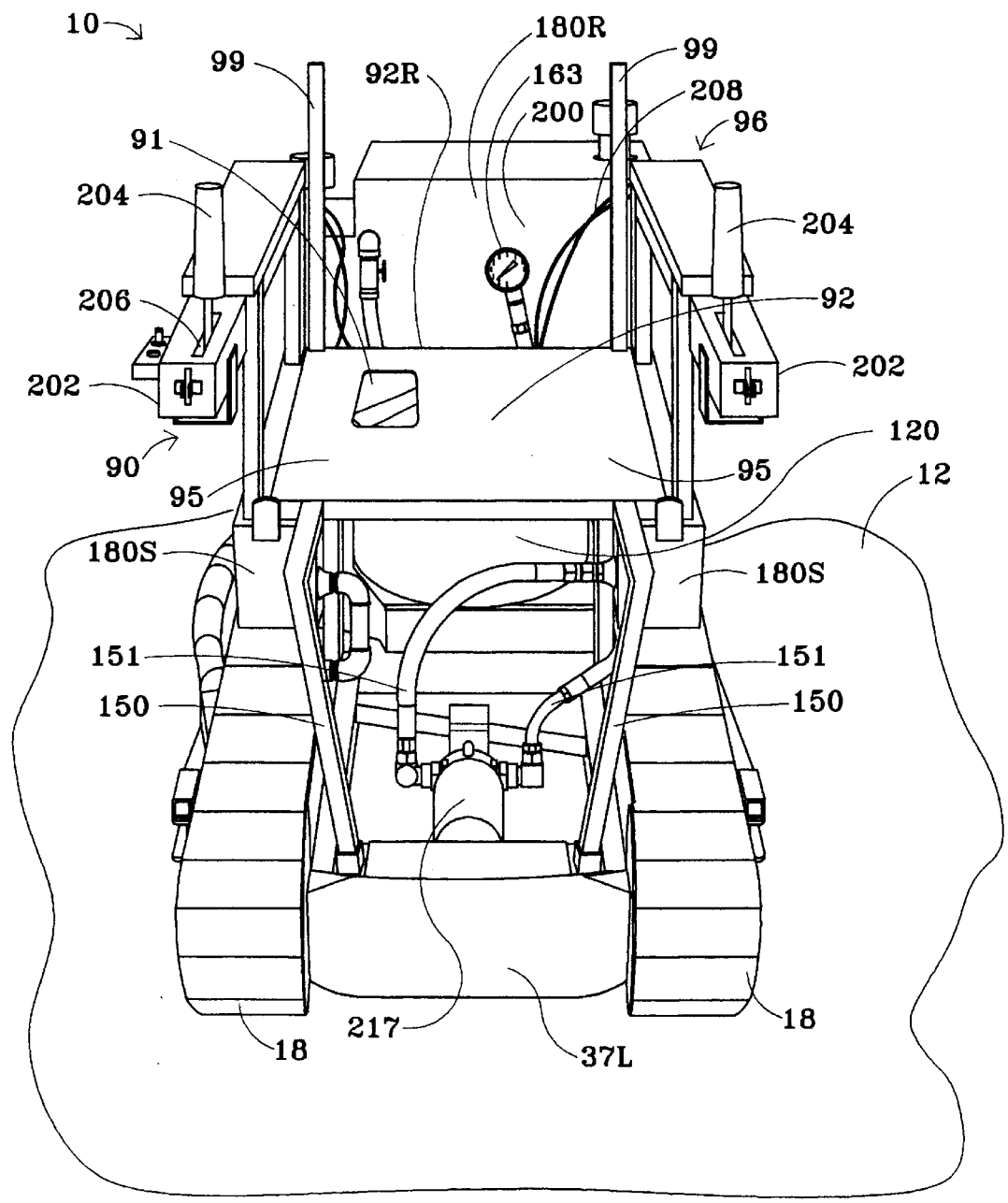
FIG. 2 is a front perspective view thereof with the seat cushion and back cushion removed.

The terms "front" and "rear" refer to the left and right portions of the vehicle as depicted in FIG. 1, and the terms "left" and "right" refer to the left and right sides of the vehicle as depicted in FIG. 2.

DETAILED DESCRIPTION OF THE PREFERRED EMBODIMENT

Figure 3:
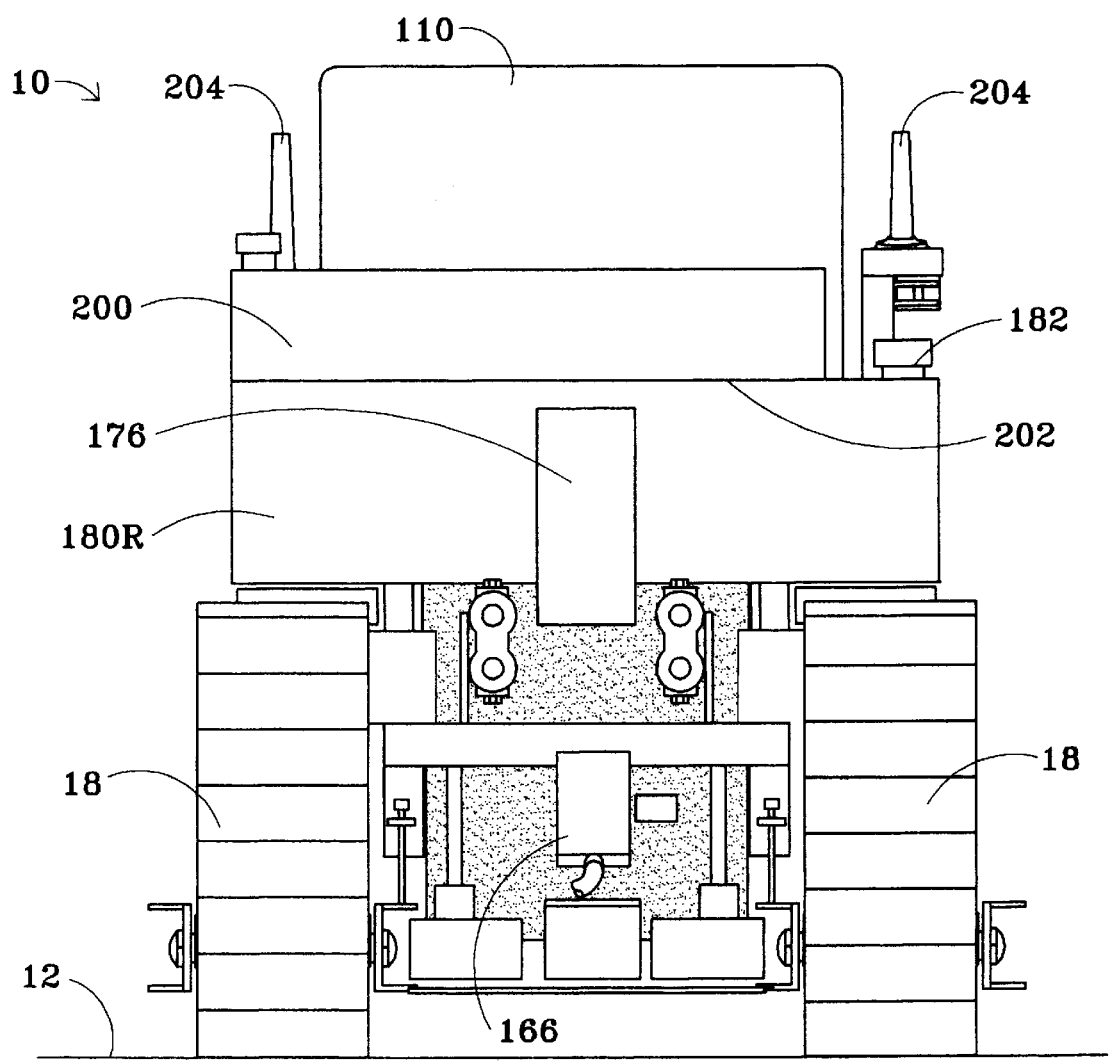
FIG. 3 is a rear elevational view of my vehicle.

Referring now to FIGS. 1–3, a self-propelled, all-terrain vehicle, denoted generally by the numeral 10, is shown resting on a ground surface 12. A parallel pair of spaced-apart track mechanisms 14 are attached to a longitudinally elongated underframe 16, as may best be seen in FIG. 4. The underframe 16 includes parallel, horizontal, left and right inner rails 34, each having a front end 34F and a rear end 34R. A front cross member 36 joins the front ends 34F; a rear cross member 38 joins the rear ends 34R. A horizontal rear plate 40 is attached to, and joins, a rear portion of each of the inner rails 34 and extends forward from the rear cross member 38 to a central portion 16C of the underframe 16. A horizontal skid plate 42 is attached to, and joins, a front portion 34F of each of the rails 34, and extends rearward from the front cross member 36 to the rear plate 40. A brush guard 37 comprising a horizontal bottom plate 37B and a forwardly and upwardly canted lip 37L extends forwardly from the front cross member 36.

Each of the track mechanisms 14 includes an outer rail 44 disposed parallel to, and attached to, an inner rail 34, respectively. Each track mechanism 14 further includes an endless belt 18 about idler wheels pivotally mounted to, and disposed between, an outer rail 44, and an inner rail 34, respectively, including a large front idler wheel 20, a large rear idler wheel 22, and two pairs of longitudinally spaced-apart, small idler wheels 24 disposed in tandem between the front idler wheel 20 and the rear idler wheel 22. Each of the belts 18 is also in driving engagement with a rear drive sprocket 26 mounted for rotation to the shaft 30 of a hydraulic motor 32.

Figure 6:
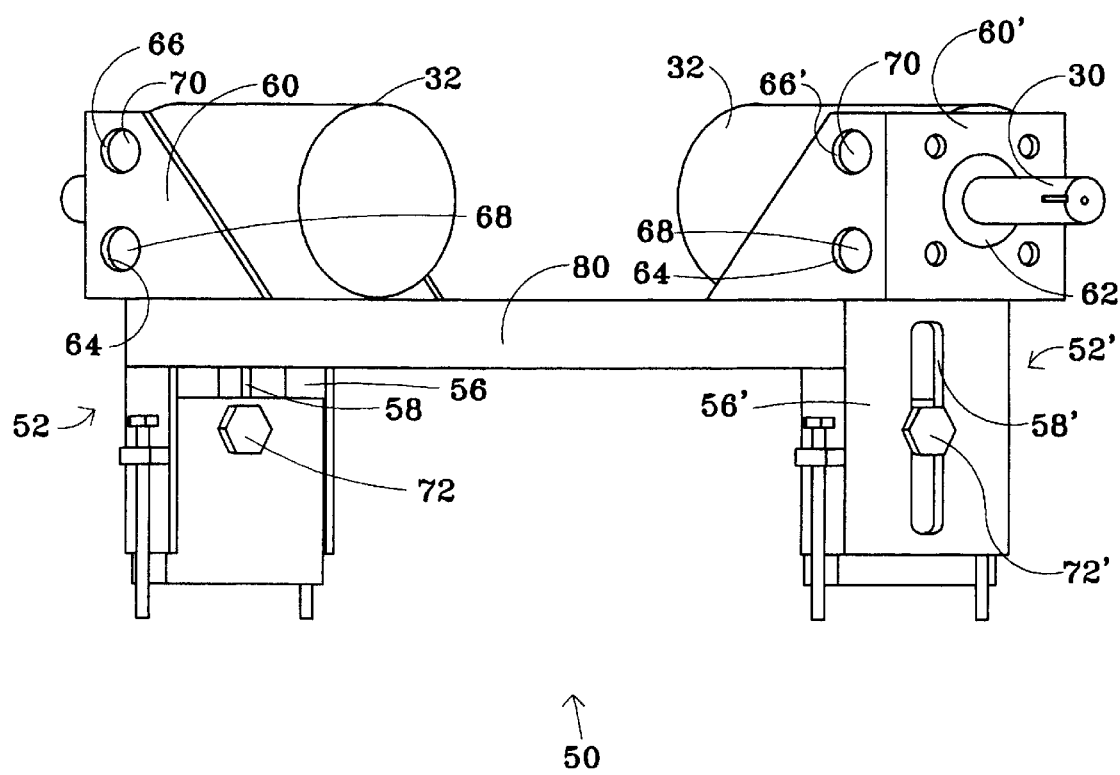
FIG. 6 is an enlarged, rear perspective view of the motor mounts of my vehicle.

The left and right hydraulic motors 32 are supported by left and right motor mount assemblies, denoted generally by the numerals 50, 50', respectively. The motor mount assemblies 50, 50' include upstanding, apertured, left and right motor mount lugs 52, 52' attached to the underframe 16 adjacent the rear cross member 38, and left and right motor mounts, 54, 54', respectively, as may be seen in FIGS. 4 and 6. Each motor mount 54, 54' includes a lower bracket portion 56, 56' attached to a motor mount lug 52, 52', and has a vertical, height adjustment slot 58, 58'. Each motor mount 54, 54' further includes an upper bracket portion 60, 60' integral with the lower bracket portion 56, 56' and extending upward therefrom. Each upper bracket portion 60, 60' has first 62, second 64, and third 66 apertures for receiving the shaft 30, forward drive port 68, and reverse drive port 70 of a hydraulic motor 32, respectively. Each upper bracket portion 60, 60' is adapted for supporting a hydraulic motor 32 with its shaft 30 oriented laterally outward of the underframe 16. A height adjustment bolt 72, 72' is inserted through each motor mount lug 52, 52' and through the height adjustment slot 58, 58' attached thereto, and fitted with a wing nut (not shown) for securing the motor mount 52, 52' at a desired height with respect to the underframe 16. A laterally disposed, horizontal tie bar 80 extends from the lower bracket portion 56' of the right motor mount 52' to the lower bracket portion 56 of the left motor mount 52. Thus, the tension in each endless belt 18 can be increased or decreased by adjusting up or down, respectively, the position of each of the hydraulic motors 32 and the rear drive sprockets 26 attached to the shafts 30 thereof.

Figure 8:
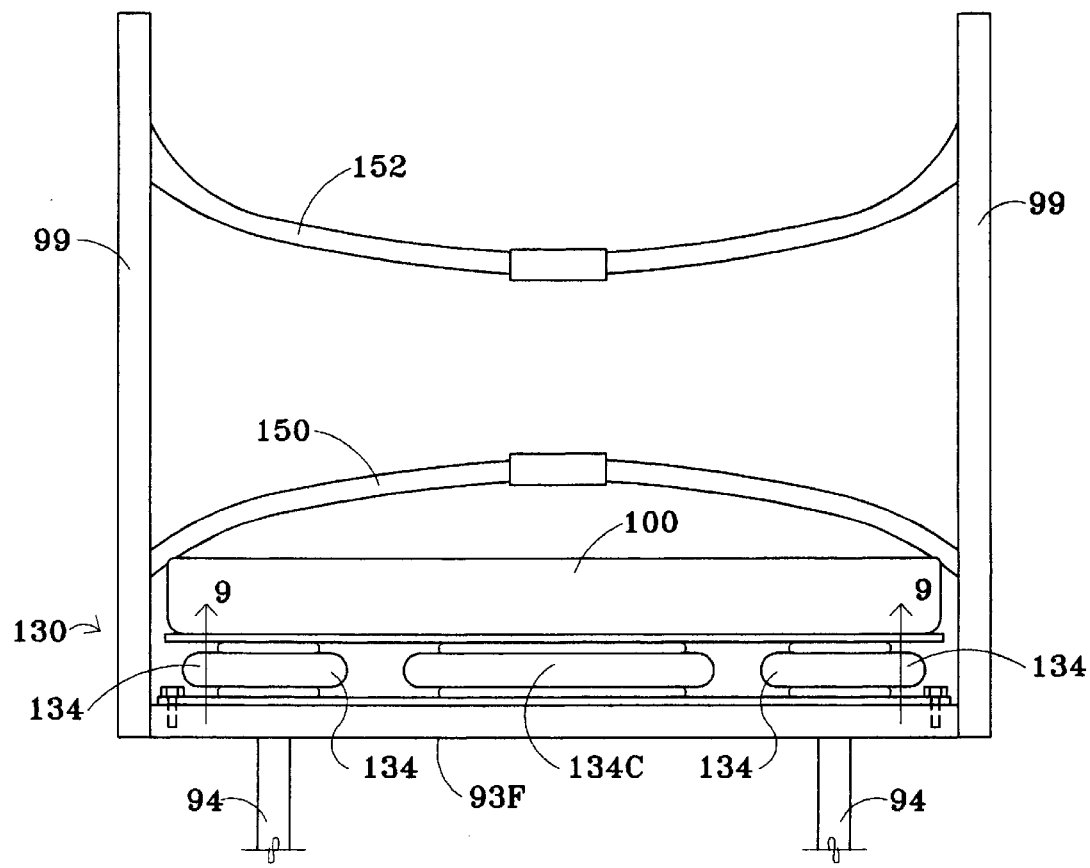
FIG. 8 is an enlarged, fragmentary front view of the seat assembly of my vehicle with the arm rests removed.

The vehicle 10 further includes a seat assembly 90 disposed above and carried by the underframe 16 to provide a passenger seating surface 100 at a height above the ground surface 12 substantially equal to the height of the seat of a conventional wheelchair—that is, preferably in the range of 20 to 27 inches above the ground surface 12, more or less. As may best be seen in FIGS. 2 and 4, the seat assembly 90 includes a flat, horizontal seat panel 92 having left and right side portions 95. The seat panel 92 rests upon, and is attached to, a rectangular seat frame 93 comprising lateral front and rear support members 93F, 93R joined by longitudinal left and right support members 97. The seat frame 93 is centrally supported above the underframe 16 by left and right pairs of equal-length, longitudinally spaced-apart, vertical seat supports 94, each having a lower end attached to the rear plate 40 and an upper end attached to the longitudinal left and right seat frame support members 97, respectively. As may be seen in FIGS. 2 and 8, the seat plate 92 extends laterally outward of the vertical seat supports 94 and out over the tracks 18, which reduces the lateral distance that a disabled person would otherwise have to heft his body sideways in order to get on or off the seating surface 100 of the vehicle 10. The seat panel 92 has a vent hole 91 to permit air flow from the underlying engine compartment 120, and is removable from the seat frame 93 for access to the engine compartment 120.

The seat assembly 90 further includes an arm rest assembly, comprising left and right pairs of equal length, longitudinally spaced-apart vertical arm rest supports 96, each having a lower end attached to the seat frame 93 and an opposite, upper end supporting a longitudinal arm rest strut 101 extending between the vertical arm rest supports 96. Resting on, and attached to each strut 101 is an arm rest 98. At least one, and preferably both, of the front vertical supports 96 is equipped with quick release catches (not shown) for easy removal from, and reattachment to, the seat frame 93, in order to facilitate a disabled person's self-assisted mounting and dismounting the vehicle 10.

The seat assembly 90 also includes left and right, vertical seat back supports 99, each having a lower end attached to the lateral rear member 93R of the seat frame 93 and an opposite, free upper end. A removable seat back cushion 110 is attached to the seat back supports 99, and a seat cushion 112 rests upon the seat panel 92.

Figure 9:
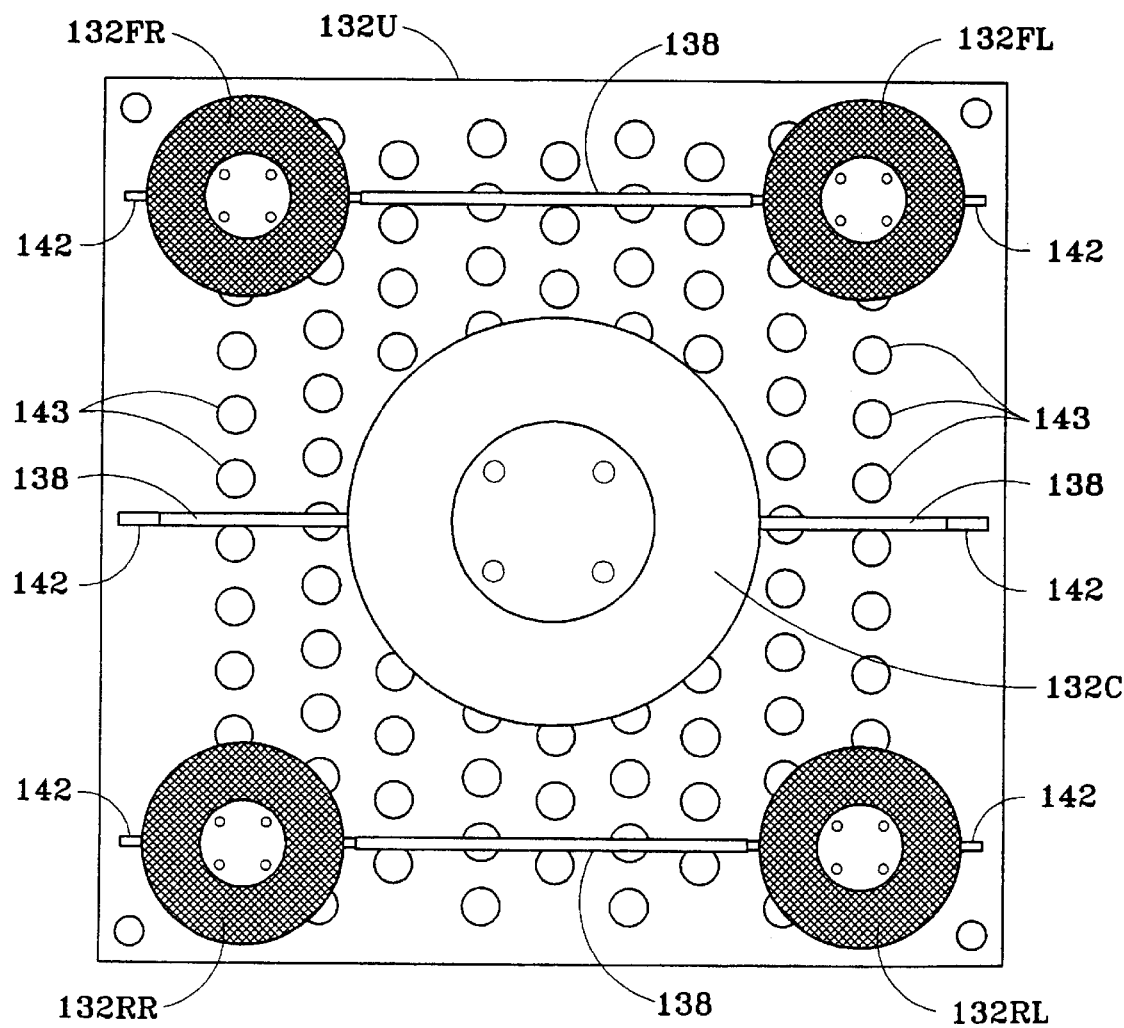
FIG. 9 is a bottom plan view of the air bladders and upper bladder support plate thereof taken along line 9—9 of FIG. 8.
Figure 10:
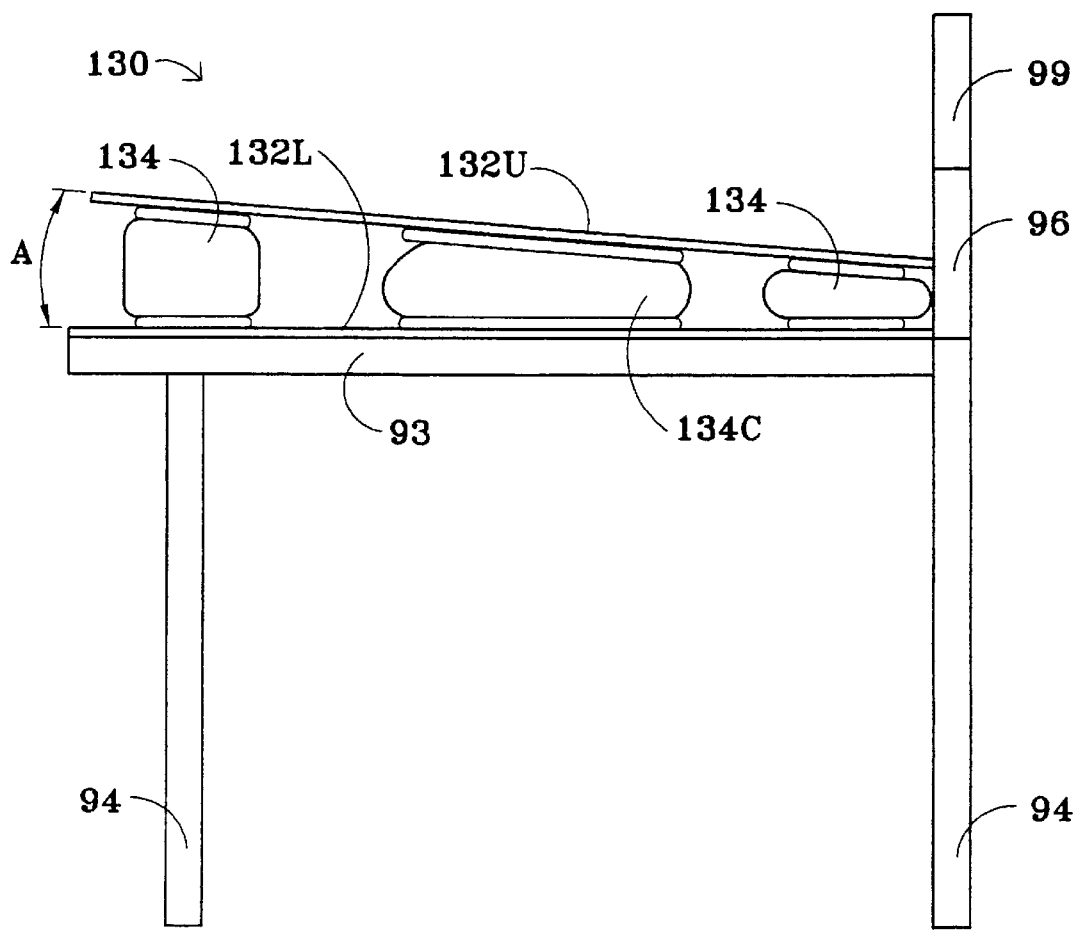
FIG. 10 is a left side elevational view thereof with the seat cushion and back cushion removed and showing the upper air bladder plate tilted due to differential air pressure in the bladders.
Figure 11:
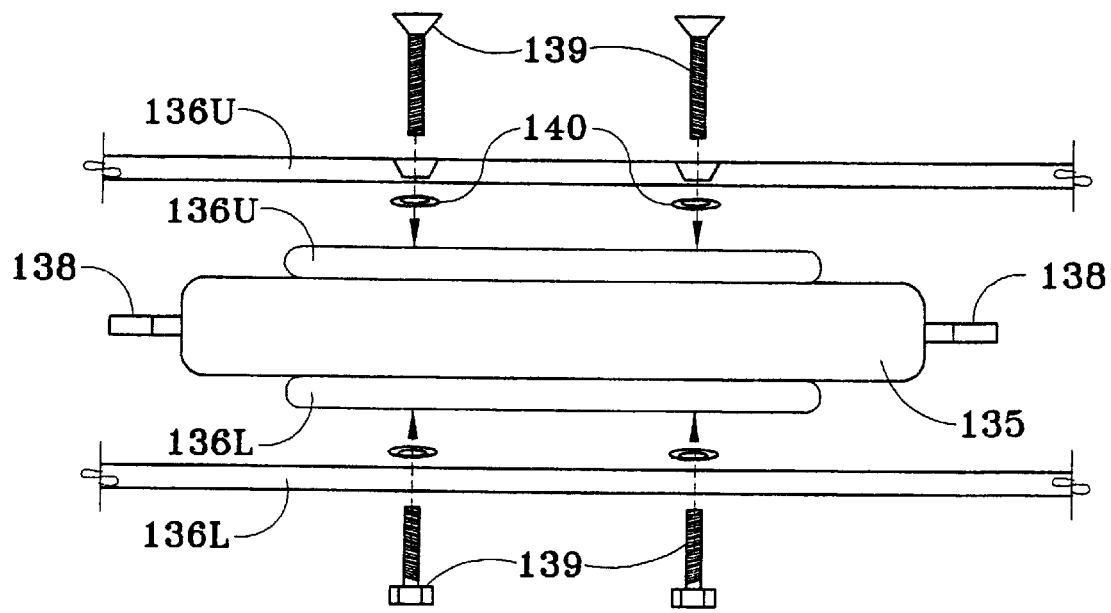
FIG. 11 is an enlarged, fragmentary, exploded view of an air bladder disposed between upper and lower bladder support plates.
Figure 12:
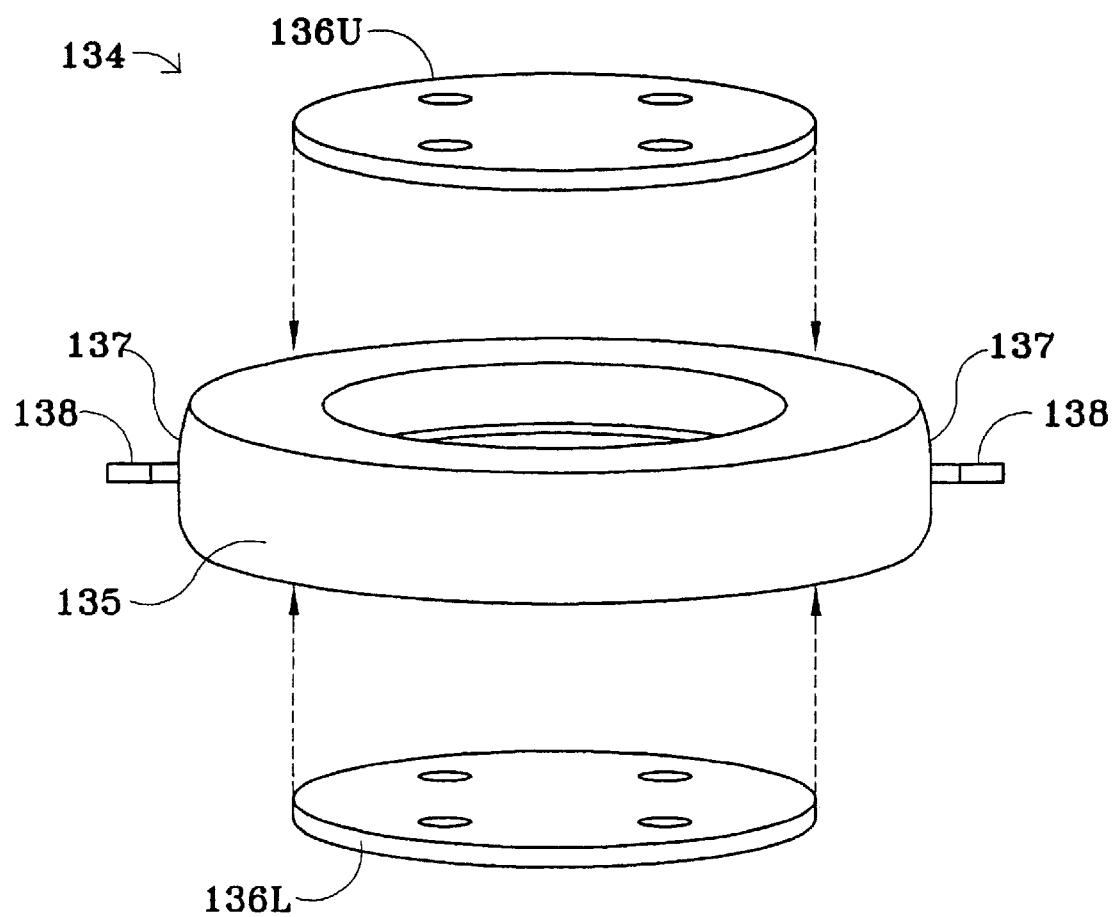
FIG. 12 is an exploded, perspective view of an air bladder.

In an alternative embodiment, the seat panel 92 is eliminated entirely and the seat assembly 90 instead includes a seat suspension system 130, as best seen in FIGS. 8–12, both for passenger comfort as well as to provide a means for adjusting the longitudinal attitude of the seat cushion 112. The seat suspension system 130 rests on an upper surface of the seat frame 93, and includes spaced-apart, upper and lower air bladder support plates, 132U, 132L, having size and shape substantially equal to that of the seat frame 93. A plurality of horizontally spaced-apart, inflatable air bladders 134 rest upon, and are attached to, an upper surface of the lower bladder support plate 132L and attached to a lower surface of the upper air bladder support plate 132U. As shown in FIG. 12, each bladder 134 has a hollow, inflatable, substantially toroidal rubber tube 135 and circular, apertured, upper and lower bladder mounting plates 136U, 136L attached to flat upper and lower surfaces of the tube 135, respectively. Mounting screws 139 and washers 140 are provided for mounting each bladder 134 between the upper and lower bladder support plates 132 U, 132L, as shown in FIG. 11. The upper support plate 132U has a plurality of ventilation holes 143. A pair of air inlet/discharge ports 137 is provided on oppositely disposed exterior surfaces of each tube 135. The bladders 134 communicate with one another by means of air hoses 138 inserted into ports 137. Referring now to FIG. 9, in a preferred embodiment, there are provided air hose-interconnected front left and front right bladders 132FL, 132FR, a centrally disposed bladder 132C, and air hose-interconnected rear left and rear right bladders 132RL and 132RR, and valve stems 142 on the left and right sides of the seat suspension system 130 for separately introducing air under pressure into the front pair 132FL, 132FR, the central 132C and the rear pair 132RL, 132RR of bladders, respectively, such that, by adjusting the relative air pressures within them, the longitudinal attitude A of the upper bladder support plate 132U—and hence that of the seating surface 100—can be adjusted.

Figure 4:
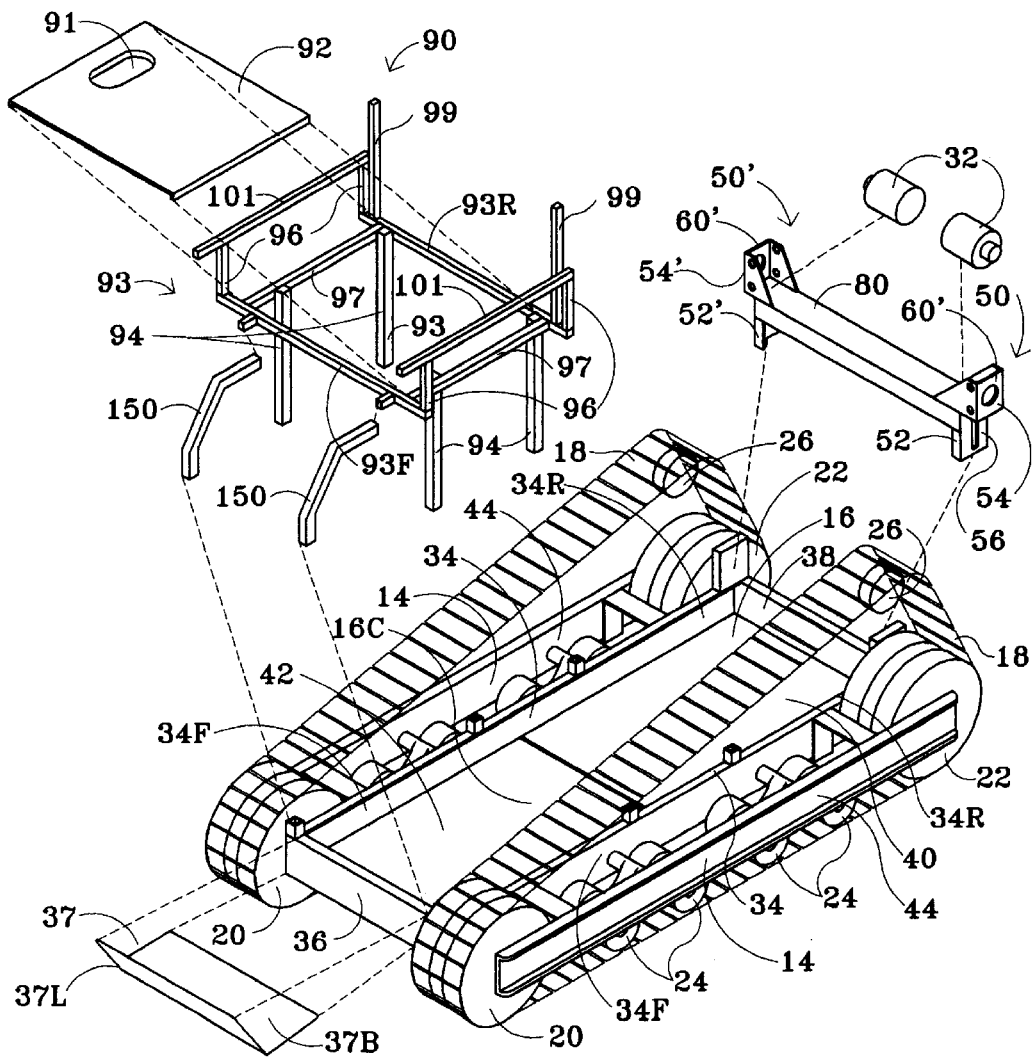
FIG. 4 is a partially exploded perspective view of the underframe, seat assembly, motor mounts, hydraulic motors, and brush deflector, together with the left and right track assemblies depicted in phantom.

It is particularly important that the legs of a paraplegic be restrained while riding the vehicle 10; accordingly, as shown in FIGS. 1 and 4, removable, laterally spaced-apart, left and right leg rests 150 extend forwardly from the lateral front support member 93F of the seat frame 93 and thence downwardly to front left and front right portions of the skid plate 42, respectively. Like the arm rests 98, the leg rests 150 preferably also have quick release catches (not shown). For additional passenger safety restraint, the seat assembly 90 is equipped with a lap belt 150 and shoulder belt 152.

Figure 7:
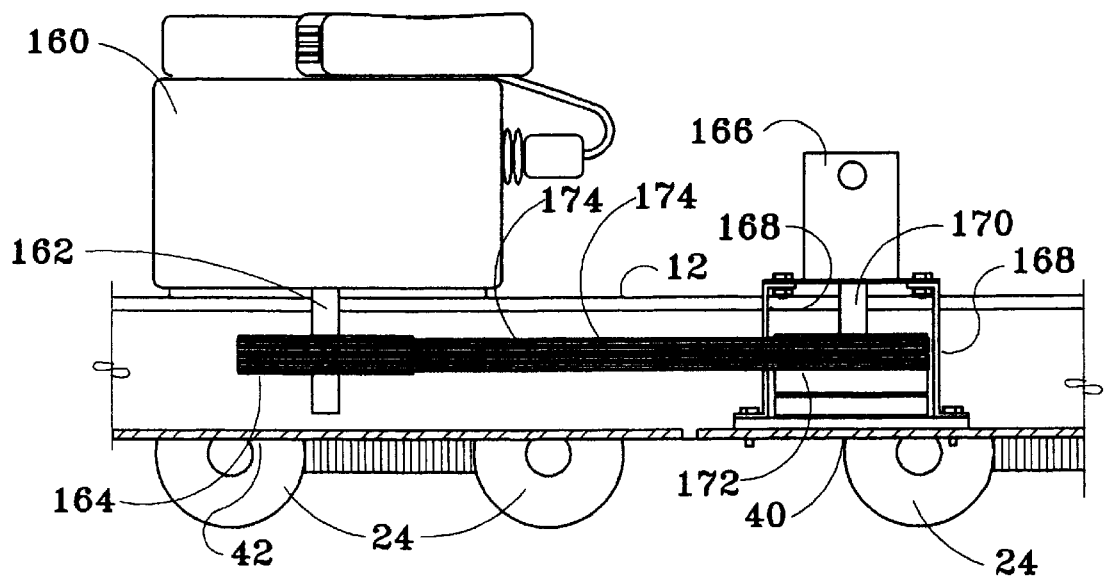
FIG. 7 is an enlarged, fragmentary, left side elevational view of the vehicle, showing the parallel shafts of the engine and hydraulic fluid pump coupled by a pair of drive belts.
Figure 21:
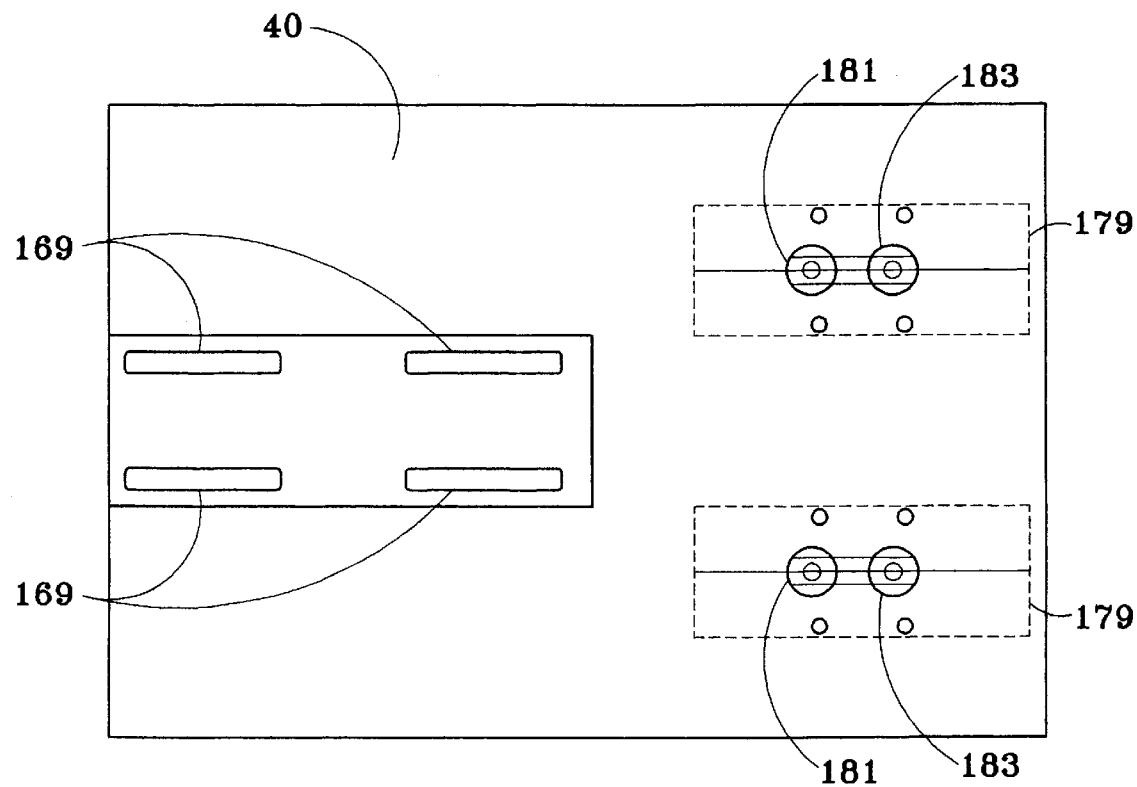
FIG. 21 is a top plan view of the rear skid mounting plate of my vehicle.

Referring now to FIG. 7, an internal combustion engine 160 is shown mounted to the underframe 16 with the engine drive shaft 162 oriented vertically downward and fitted with an engine drive shaft pulley 164. For adequate vehicle hill climbing ability, the engine 160 should preferably be rated at 12 to 16 horsepower. A hydraulic pump 166 is shown mounted to the rear skid plate 40 by a pair of pump mounting brackets 168, rearward of the engine 160, with pump driven shaft 170 also oriented vertically downward and fitted with a pulley 172. Dual drive belts 174 about the engine shaft pulley 164 and the pump pulley 172 couple rotation of the engine drive shaft 162 to the pump driven shaft 170. Such longitudinal spacing, instead of lateral spacing, of the engine drive shaft 162 and the pump driven shaft 170 is for maintaining a narrow lateral vehicle profile—that is, maintaining the track mechanisms 14 as close to one another as possible—thereby contributing to the ease of mounting and dismounting the vehicle. Moreover, since the engine 160 and hydraulic pump 166 are relatively heavy components, mounting them directly on the underframe 16 helps achieve a low center of gravity for vehicle stability. The brackets 168 mount in two pairs of longitudinally elongated slots 169 in the rear skid plate 40, shown in FIG. 21, to permit adjustment of the tension in the drive belts 174.

Further to maintain the vehicle's narrow lateral profile, hydraulic fluid is stored in a hydraulic fluid tank 180 that includes left and right wing tank portions 180W disposed under the left and right side portions 95 of the seat panel 92, respectively, that are joined by, and communicate with, a rear tank portion 180R disposed behind the seat frame 93. The rear tank portion 180R has a filler port 182 for adding hydraulic fluid to the tank 180. Preferably, the wing tank portions 180W are substantially triangular in longitudinal cross-section, having a pair of substantially triangular side walls 185 joined by a horizontal top wall 184, a forwardly and downwardly sloping bottom wall 186, and a vertical front wall 190. This arrangement, together with making the engine fuel tank 200 as an upper compartment to the hydraulic fluid rear tank, whereby they share a common wall, further saves space between the two track mechanisms 18 and contributes to the desired narrow vehicle profile. The engine includes an electric starter motor (not shown), which is powered by an electric storage battery 176 mounted to the vehicle 10 behind the rear portion 180R of the hydraulic fluid tank 180.

Figure 23:
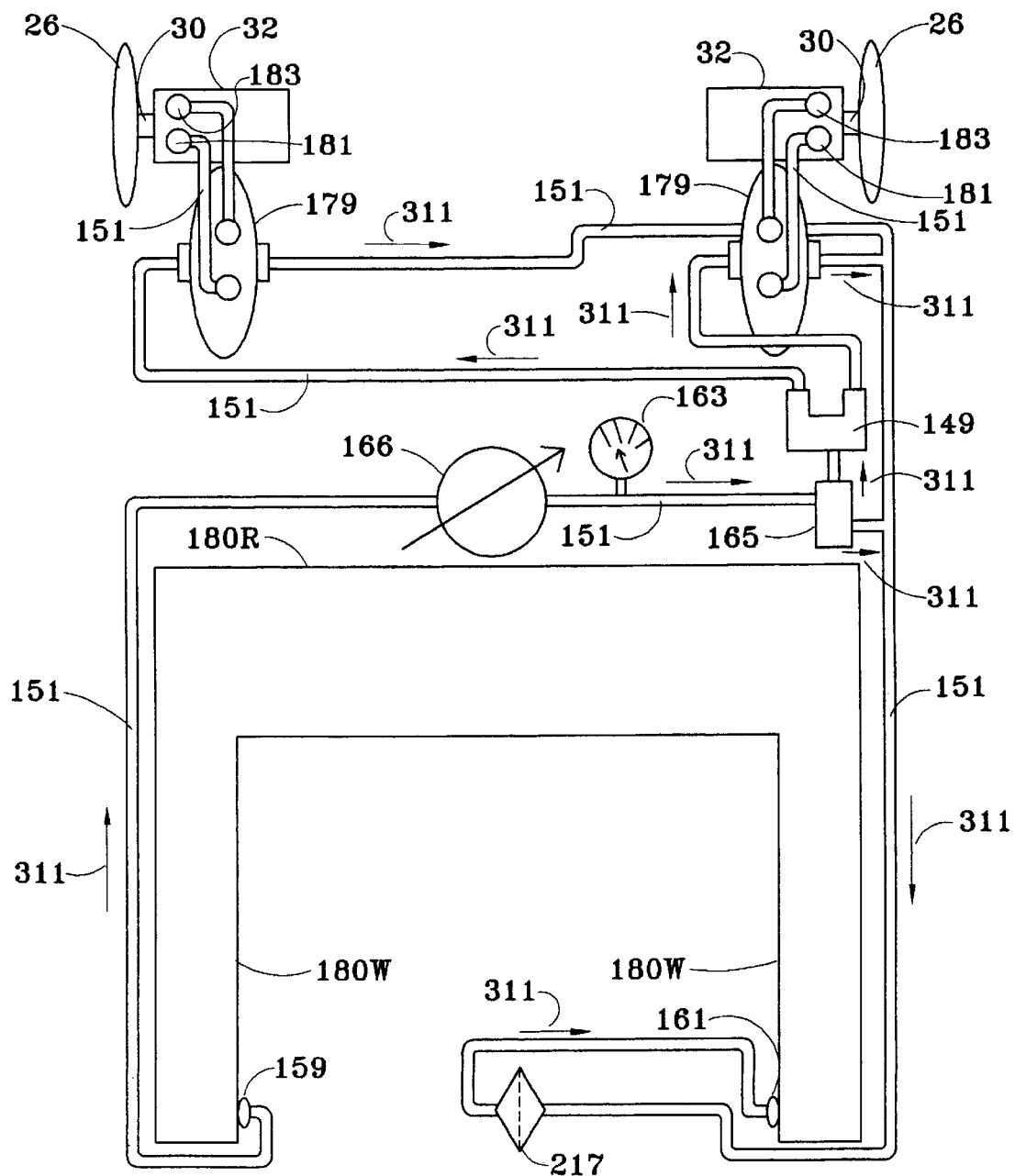
FIG. 23 is a schematic diagram of the hydraulic drive system of my vehicle.
Figure 24:
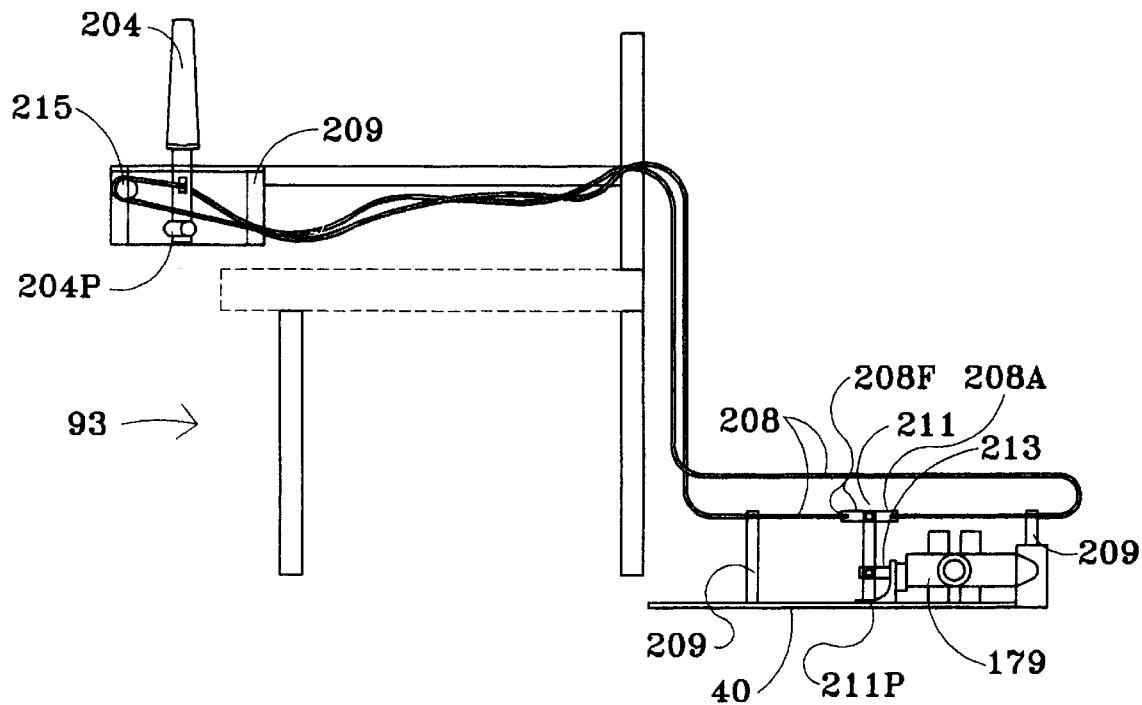
FIG. 24 is a schematic diagram of the left hydraulic control cable of my vehicle.

Hydraulic drive control means 202 are provided for initiating forward, reverse and turning movements of the vehicle 10 over a ground surface 12. Left and right hydraulic drive hand controls 202 are attached to, and extend forwardly from, the left and right vertical arm rest supports 96, respectively. Each hand control 202 is equipped with an upstanding hand grip lever 204 having a lower end pivotally mounted thereto at pivot point 204P for forward and reverse, hand-controlled movements within a longitudinal slot 206 therein. As shown in greater detail in FIGS. 21, 24, for each hand control 202 a control cable 208 is attached to a hand grip lever 204 at attachment point 204A above pivot point 204P. From each pivot point 204P, each cable 208 is looped around a cable pulley 215, thence rearward through a cable attachment bracket 209 within the hand control 202 that secures the outer sheath of the cable 208; thence down behind the seat assembly 92, through a cable attachment bracket 209, thence terminating in a first cable end 208F that is connected to an upstanding rocker arm 211 pivotally attached at point 211P to the rear skid plate 40. Also attached to a rocker arm 211 is an opposite, second end of each cable 208, from whence the cable 208 runs forwardly back to the point of attachment 204A on lever 204. Each rocker arm 204 is adjacent to a spool-type hydraulic control valve 179 that receives fluid under pressure conducted from the pump 166 through a hydraulic pressure gauge 163, pressure relief valve 165, and hydraulic fluid flow divider 149, whereby forward and rearward movements of the hand grip lever 204 cause corresponding movements of the rocker arm 211 and of the spool within the valve 179 attached to the rocker arm 211. Forward drive outlet ports 181 and reverse drive outlet ports 183 on the left and right control valves 179 are connected by hydraulic conduit 151 to the forward drive port 68 and reverse drive port 70 of the left and right hydraulic motors 32. The arrows 311 in FIG. 23 show the direction of flow of hydraulic fluid, including the return flow from each of the motors 32 through a filter 217 through an inlet port 161 into the hydraulic fluid tank 180. Thus, so long as the engine 160 is driving the pump 166, pushing only the right lever forward will cause the vehicle to turn left, pulling the same lever rearward will cause the vehicle to turn right, pushing the left and right levers forward will cause the vehicle to move forward, and pulling the left and right levers rearward will cause the vehicle to move rearward, the speed of movement being proportional to the amount of displacement of the levers 204.

Figure 5A:
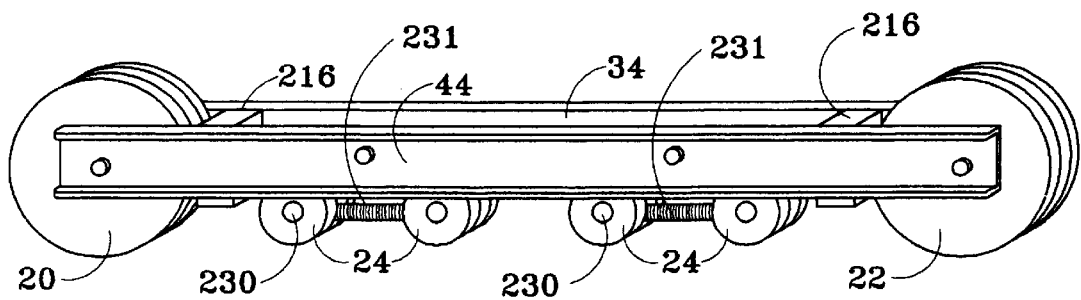
FIG. 5A is a perspective view of a track mechanism of my vehicle.
Figure 5B:
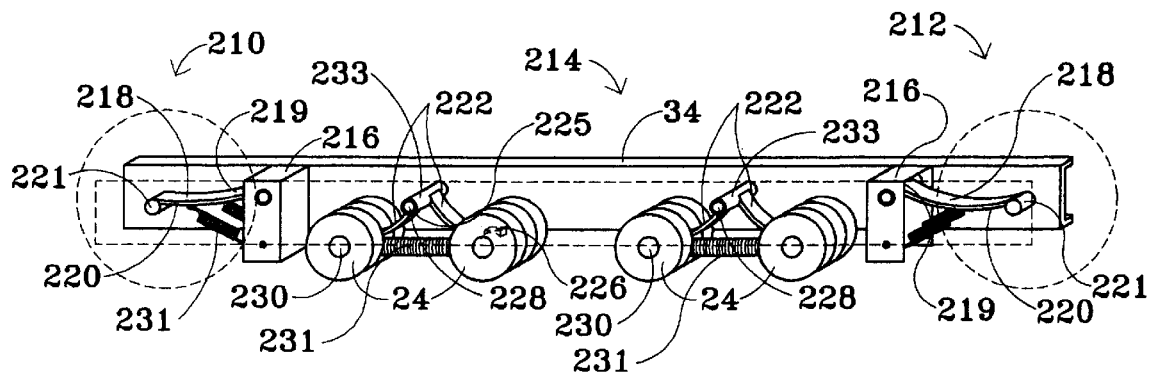
FIG. 5B is a perspective view thereof with one support member removed to show the spring couplings for the large and small idler wheels.

Referring now to FIGS. 5A, 5B, the vehicle 10 preferably has means 210, 212 for spring coupling to the inner and outer rails 34, 44, the large front idler wheels 20 and the large rear idler wheels 22, respectively, as well as means 214 for spring coupling thereto each pair of small idler wheels 24. The means 210, 212 each include a spacer bracket 216 interposed between, and joining, the front and rear portions of the inner and outer rails, 34 and 44, respectively. Each spacer bracket 216 has a laterally-disposed, cylindrical, first spacer shaft 228 about which is pivotally circumposed a first end bushing portion 219 of a longitudinally disposed band spring 218; an opposite, second end bushing portion 221 of the band spring 218 is adapted for rotational mounting of a large idler wheel 20, 22. A parallel pair of tension springs 231 connect central portions of each band spring 218 to the spacer bracket 216. Each of the means 214 includes a pair of longitudinal, oppositely-directed band springs 222 having first ends 225 joined by a laterally disposed, hollow, cylindrical bushing 233 pivotally circumposed about a laterally disposed, cylindrical, second spacer shaft 228 mounted between the inner and outer rails 34, 44, and opposite, free, second bushing ends 226 adapted for rotational mounting of small idler wheels 24. A tension spring 231 is provided for each means 214 and connects the free, second bushing ends 226 thereof. Incorporation of means 210, 212, 214 into the vehicle 10 provides a smoother, more comfortable ride, particularly over rough terrain.

Figure 13:
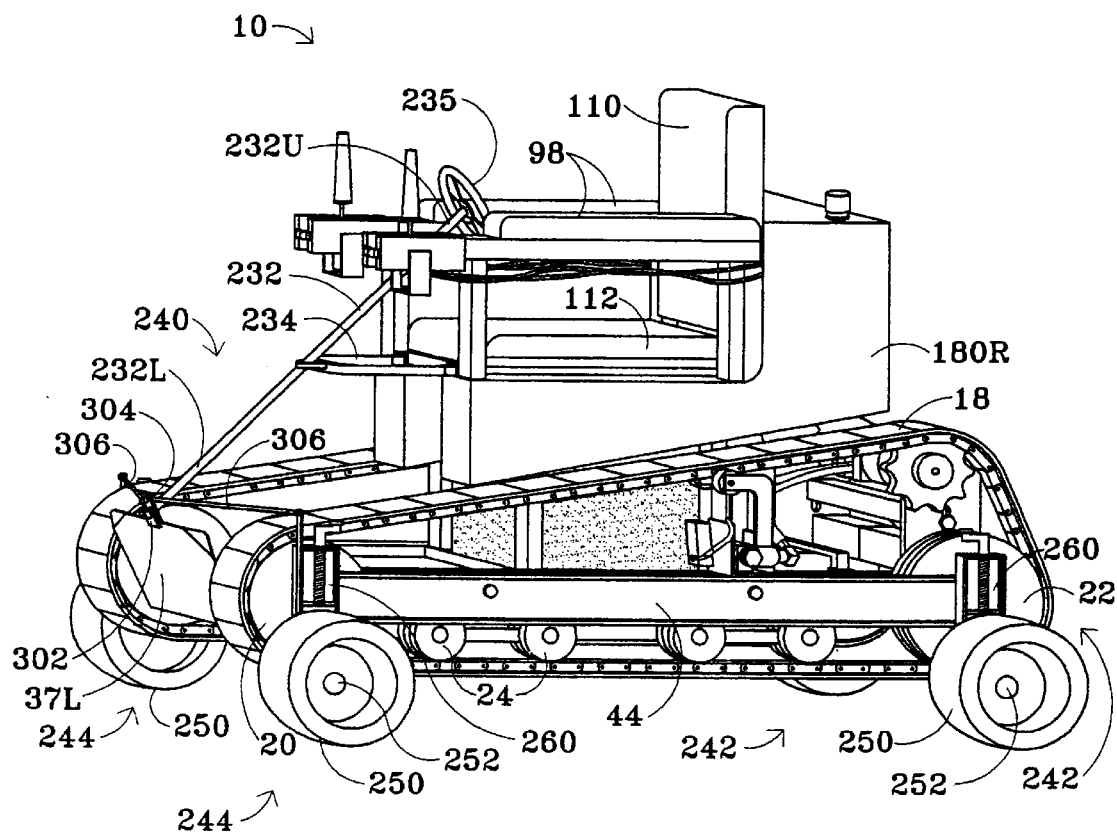
FIG. 13 is a left side perspective view of an alternate embodiment of my vehicle with the leg rests removed, further comprising a steerable, auxiliary wheel system.
Figure 16A:
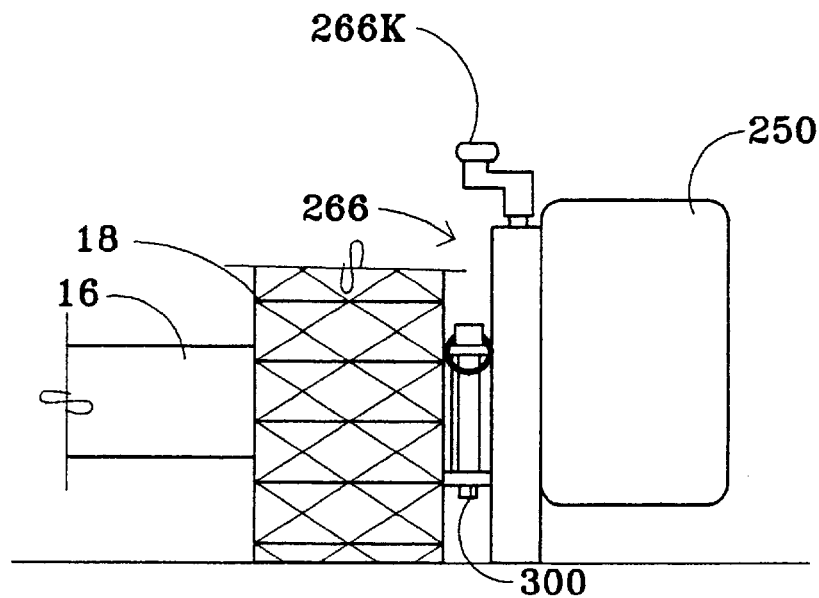
FIG. 16A is a partial, right rear elevational view thereof showing the rear right auxiliary wheel retracted.
Figure 16B:
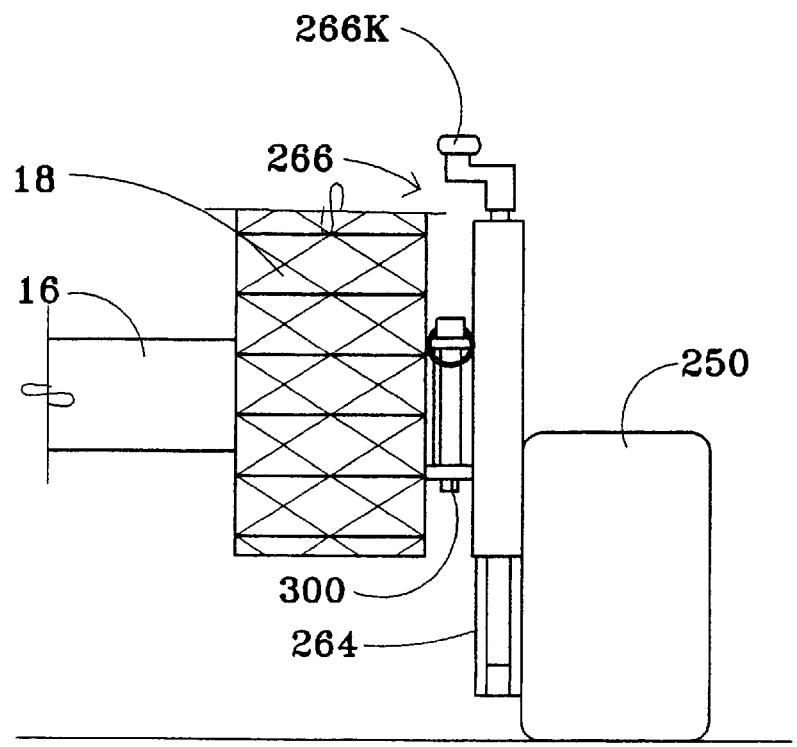
FIG. 16B shows the right rear auxiliary wheel lowered to the surface and ready for use.
Figure 19A:
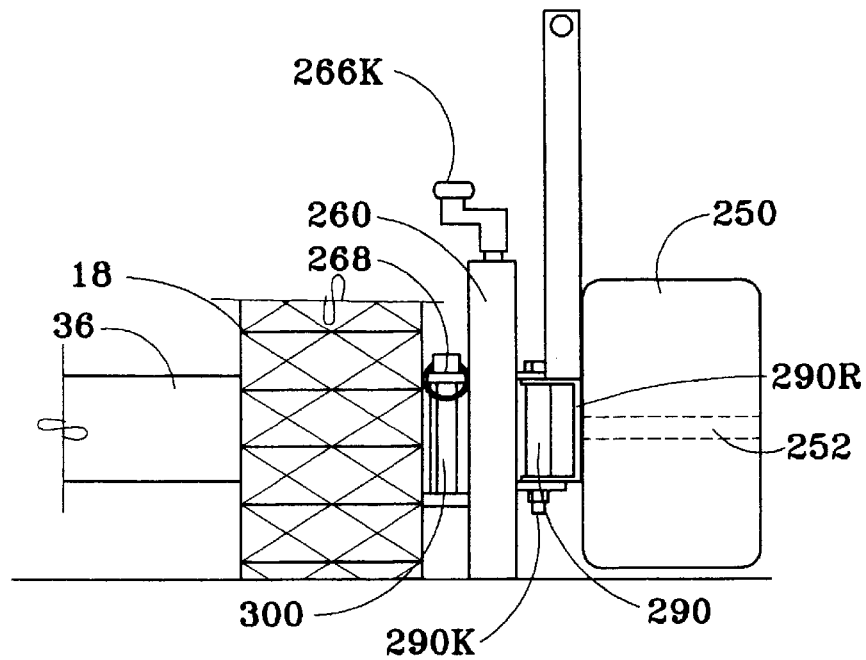
FIG. 19A is a partial, left front elevational view thereof showing the front left auxiliary wheel retracted.
Figure 19B:
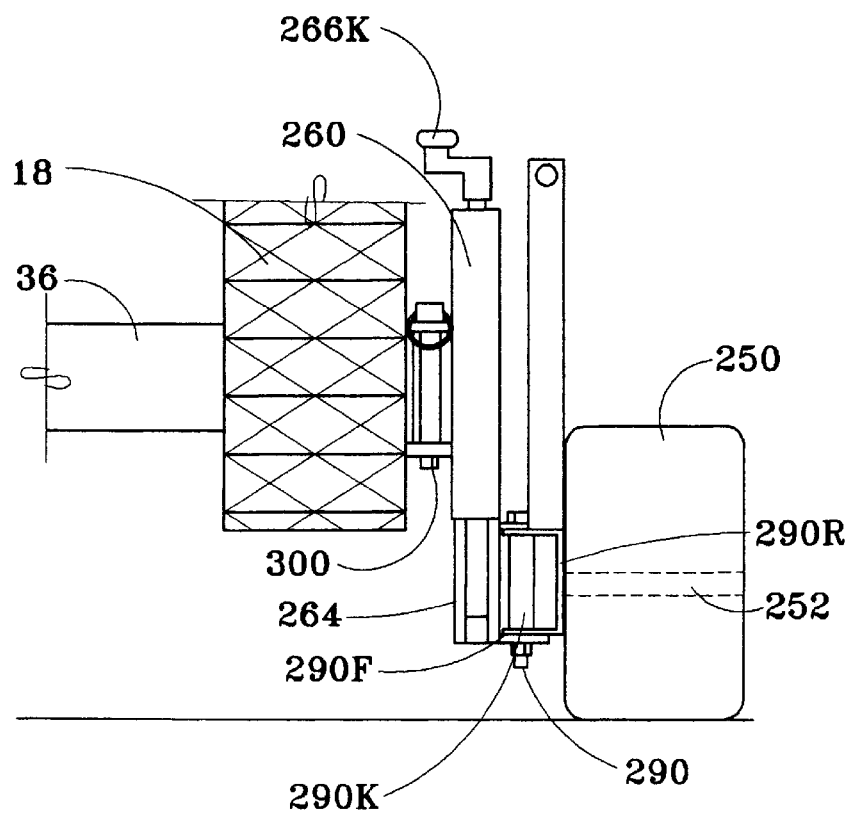
FIG. 19B shows the right front auxiliary wheel thereof lowered to the surface and ready for use.

In the event of engine failure or other mishap that renders the vehicle inoperable on remote or rough terrain, it is desirable to be able to roll the vehicle by means of a steerable auxiliary wheel system to the nearest road for transporting the vehicle to a repair facility. A steerable auxiliary wheel system, denoted generally by the numeral 240, is depicted in FIGS. 13–20, installed on the vehicle 10 and ready for use. Left and right rear wheel assemblies 242 are attached to rear portions of the outer rails 44 and left and right front wheel assemblies 244 are attached to front portions of the outer rails 44, respectively. Each wheel assembly includes an auxiliary wheel 250, rotatably mounted on a horizontal axle 252, that are height adjustable between an upper retracted position (FIGS. 14, 16A, 19A) and a lower, ground surface-engaging position (FIGS. 13, 16B, 19B). The steering assembly system 240 comprising a removable steering column 232 having an upper end 232U with attached steering wheel 235 and an opposite, lower end 232L, a removable steering column support 234 attached to the front support member 93F and in supporting engagement with the steering column intermediate the upper and lower ends of the column 232, and a steering linkage means 238, attached to a lower, front portion of the vehicle 10, for imparting pivotal motions to each of the front auxiliary wheels 250 about a vertical axis V adjacent each of the wheels 250 in response to rotational motions of the steering wheel 235.

Figure 14:
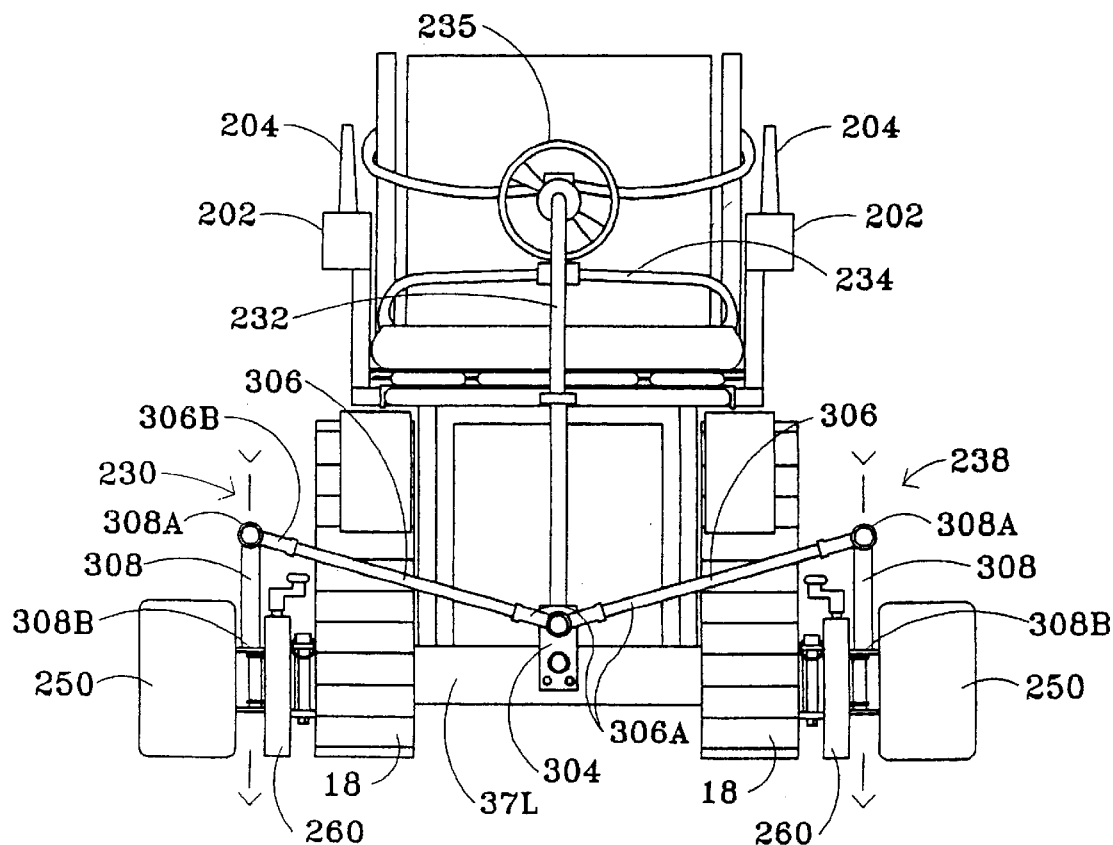
FIG. 14 is a front elevational view thereof.
Figure 15:
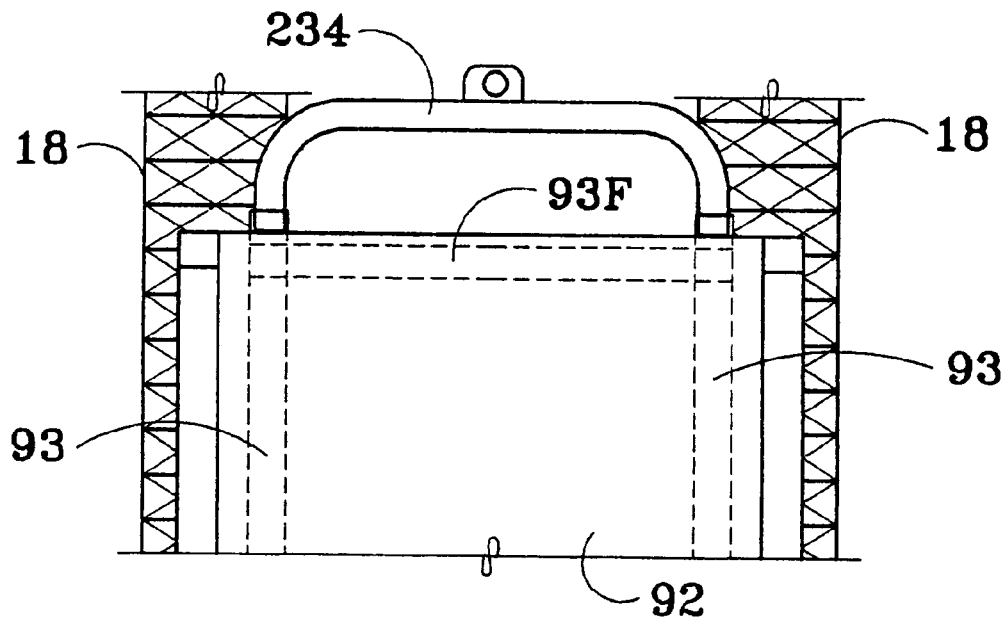
FIG. 15 is an enlarged, fragmentary view of the seat assembly thereof after removal of the seat cushion and the steering column, showing the steering column support attached to the seat frame and the seat frame in phantom outline.
Figure 17A:
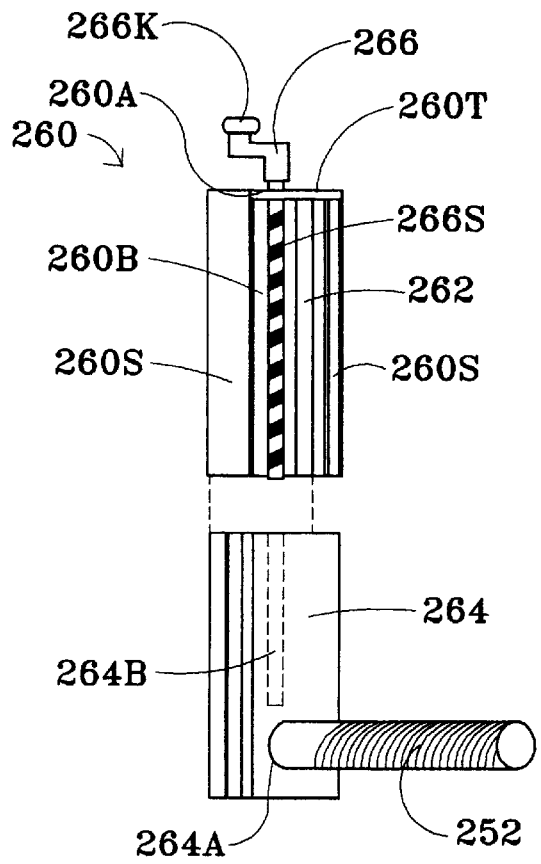
FIG. 17A is an enlarged, perspective view of a wheel height adjustment block and wheel mount thereof.
Figure 17B:
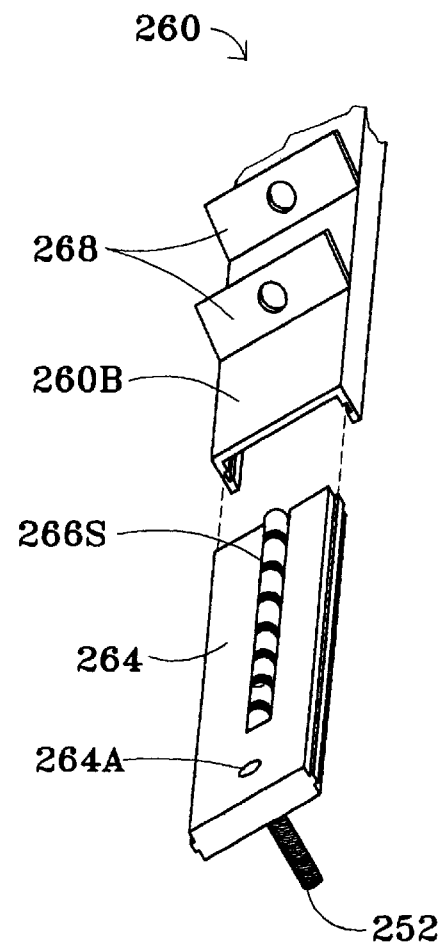
FIG. 17B is a perspective view of a wheel mount in telescopic relation to a height adjustment channel of said block.
Figure 18A:
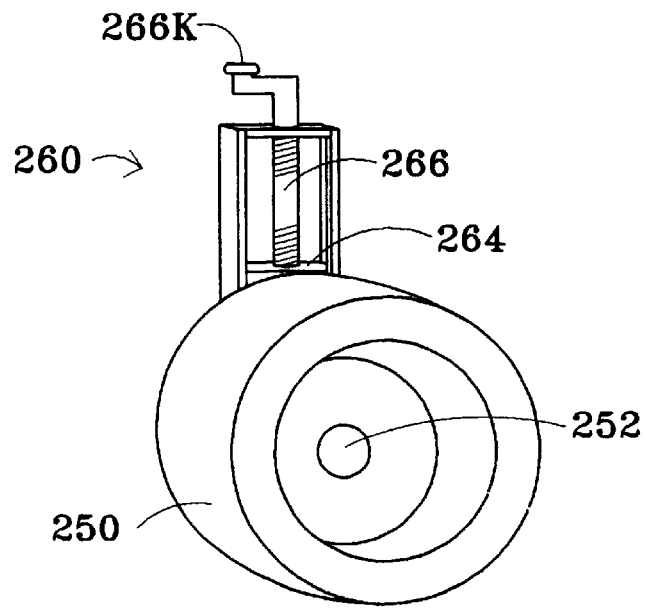
FIG. 18A is an exterior side perspective view of an auxiliary wheel and wheel mount thereof.
Figure 18B:
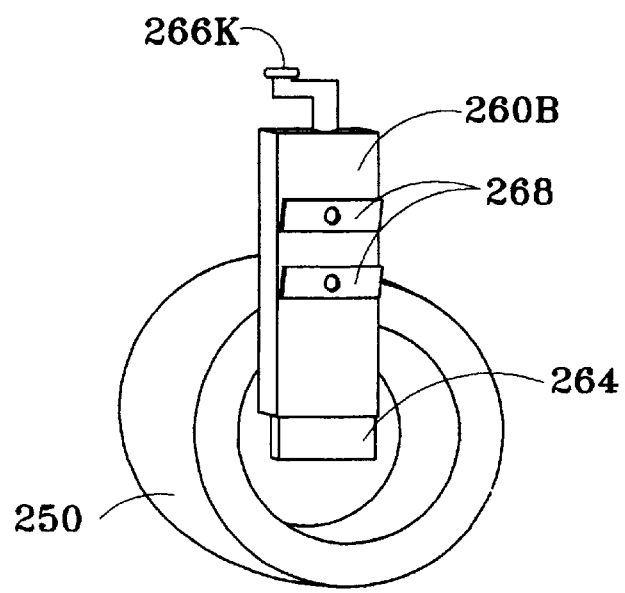
FIG. 18B is an opposite, interior side perspective view of an auxiliary wheel and wheel mount thereof.

Each of the front and rear wheel assemblies 242, 244, further includes a wheel height adjustment block 260 attached to an outer rail 44. As shown in FIGS. 17A, 17B, each block 260 has a vertically elongated back wall 260B, and side walls 260S and a top wall 260T that extend laterally outward from the back wall 260B, defining a vertical, height adjustment channel 262. A vertically-elongated wheel mount 264 is adapted for vertical sliding movement within the height adjustment channel 262. For each of the rear auxiliary wheel systems 242, the wheel mount 264 has an aperture 264A into which is inserted a first, fixed end of a wheel axle 252, a second opposite end of the axle 252 being oriented laterally outward from the vehicle 10, as shown in FIGS. 17A, 17B. For each of the front auxiliary wheel systems 244, however, instead of an axle 252 being directly attached to the wheel mount 264, a fixed portion 290F of a steering knuckle 290 is attached to, and extends laterally outward from the wheel mount 264, as shown in FIGS. 19A, 19B, and an axle 252 (shown in phantom outline) is attached to a steering arm portion 290R of the knuckle 290 rotatable about a kingpin 290K. For mounting each of the blocks 260 to the outer rails 44, there are provided, as shown in FIG. 17B, a pair of apertured, spaced-apart mounting lugs 268 that extend laterally inward from the back wall 260B for securing the block 260 to an outer rail 44 by means of a block pin 300. The wheel mount 264 has a vertical, threaded bore 264B, shown in phantom outline in FIG. 17A. A wheel height adjustment crank 266 has a threaded vertical shaft 266S inserted through aperture 260A in the top wall 260T and in threaded engagement with the threaded bore 264B, and an offset crank knob 266K, whereby rotation of the knob 266K causes vertical movement of the wheel 250 mounted on the axle 252. That is, during periods of time when the steerable auxiliary wheel system 240 is not in use, the wheels 250 are raised, by turning the crank 266 in a first direction, up to an upper, retracted position as depicted in FIGS. 16A and 19A; but, when the system 240 is to be used, the wheels 250 are lowered, by turning the crank 266 in a second, opposite direction, down to a lower, ground surface-engaging position as depicted in FIGS. 13, 14, 16B, and 19B. When the system 240 is not in use, the steering column 232 and support 234 may remain installed on the vehicle as shown in FIGS. 13, 14, or they may be removed from the vehicle and stored in some convenient location where they will be easily accessible in case the vehicle becomes inoperable.

In addition to the steering knuckles 290, the steering linkage means 238 preferably further includes an upstanding, apertured steering post 302, rigidly attached to the brush guard, through which is inserted the steering column lower end 232L, and an upstanding pivot arm 304 rigidly attached to the steering column lower end 232L and rotatable therewith. The means 238 also includes left and right lateral steering links 306, each having a first end 306A pivotally attached to the pivot arm 304 and a second, opposite end 306B, and left and right vertical steering links 308 each having a first end 308A pivotally attached to a lateral steering link second end 306B and a second, opposite end 308B pivotally attached to a steering arm 290R. Therefore, for example, when the wheels 250 are lowered to ground surface 12 and the vehicle 10 is being rolled forward, rightward rotation of an upper portion of the steering wheel 235 moves the lateral steering links 306 rightward, which clockwise (as viewed from above) pivots the front steering arms 290R and attached wheels 250 about the kingpins 219K for executing a vehicle right turn (vice-versa, for executing a vehicle forward left turn)

The underframe 16 is preferably made of mild steel and the idler wheels of UHMW® plastic. Except for the seat cushion 112, back cushion 110, and rubber bladders 134, 134C, the seat assembly 90 is preferably aluminum, square aluminum tubing being used for the seat frame 93, as well as for the arm rest assembly 90, and the leg rests 150. The motor mounts 54 are also preferably aluminum. The hydraulic fluid tank 180 and the fuel tank 200 may be made of a rigid plastic or of aluminum.

Figure 22:
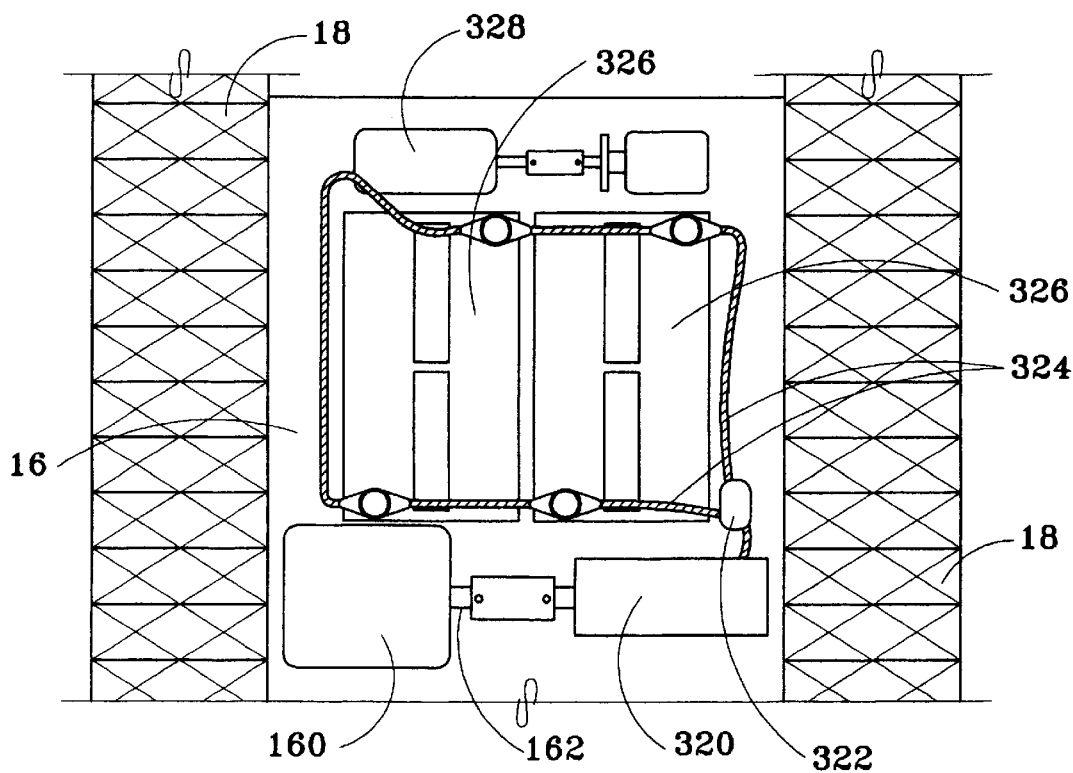
FIG. 22 is a fragmentary, top plan view of an alternative embodiment of my vehicle.

An alternative embodiment of the vehicle is depicted in FIG. 22, wherein an internal combustion engine 160 mounted on the underframe 16 instead drives a direct current electric generator 320, the electric power output of which is conducted through a voltage regulator 322 by electric cables 324 to electric storage batteries 326. An electric motor 328 wired to the batteries 326 drives a hydraulic fluid pump 166. In this embodiment, a less powerful engine, rated at 2 to 4 horsepower, will suffice.

Various changes and modifications will become obvious to those skilled in the art. For example, an electric solenoid-actuated, hydraulic spool valve could be susbstituted for each of the cable-actuated control valves 179, thereby eliminating the cables 208 and pulleys 215, with concomitant substitutions of electromechanical hand controls for the hand controls 202 described and illustrated herein—all as is well known to persons of ordinary skill in the art. It is the intent that these changes and modifications are to be encompassed within the spirit of the appended claims and that the invention described herein and shown in the accompanying drawings is illustrative only and not intended to limit the scope of the invention.

I claim:

1. An all terrain vehicle for self-assisted transfers of a disabled passenger between said vehicle and a wheelchair, and for transporting the passenger over a ground surface, comprising:

a longitudinally elongated underframe carried between two track mechanisms, each of said track mechanisms having an endless belt about the same and pivotally mounted idler wheels and a rear drive sprocket in driving engagement with the belt;

a seat assembly centrally disposed above and carried by the underframe and providing a passenger seating surface that extends laterally outward over the track mechanisms wherein the passenger seating surface is at least 20 inches and not more than 27 inches above the ground surface;

hydraulic drive means mounted on the vehicle, said hydraulic drive means including hydraulic motors coupled to said drive sprockets, each motor supported by a motor mount assembly attached to the underframe;

an internal combustion engine mounted on the vehicle and coupled to the hydraulic drive means for powering the vehicle; and hydraulic drive control means mounted on the vehicle for initiating and controlling forward, reverse, and turning movements of the vehicle over said ground surface.

2. The vehicle of claim 1, further comprising a hydraulic fluid tank mounted on the vehicle, said tank including:

a substantially identical pair of longitudinally extended, hydraulic fluid wing tank portions, said wing tank portions being disposed under opposite side portions of the passenger seating surface; and a hydraulic fluid rear tank portion disposed behind the seat assembly, said rear tank portion joining, and in communication with, said wing tank portions.

3. The vehicle of claim 2, wherein the wing tank portions are substantially triangular in longitudinal cross-section, having a pair of substantially triangular side walls joined by a horizontal top wall, a vertical front wall, and a forwardly and downwardly sloping bottom wall.

4. The vehicle of claim 3, wherein one of said wing tank portions has an exit port for delivering hydraulic fluid to said hydraulic drive means, and another one of said wing tank portions has a return port for receiving hydraulic fluid from said hydraulic drive means.

5. The vehicle of claim 4, further comprising a fuel tank mounted on the vehicle and disposed above the rear tank portion of the hydraulic fluid tank.

6. The vehicle of claim 5, wherein the fuel tank is integral with the hydraulic fluid rear tank portion and has a bottom wall that is also a top wall of said hydraulic fluid rear tank portion.

7. The vehicle of claim 2, wherein the underframe includes:

(a) left and right inner rails, each inner rail having a front end and a rear end;

(b) a front cross member joining said inner rail front ends;

(c) a rear cross member joining said inner rail rear ends;

(d) a rear skid plate attached to, and joining, a rear portion of each of the inner rails, and extending forward from the rear cross member to a central portion of the underframe; and (e) a horizontal front skid plate attached to, and joining, a front portion of each of the inner rails, and extending rearward from the front cross member to said rear skid plate.

8. The vehicle of claim 7, wherein the seat assembly further includes:

(a) a horizontal, substantially rectangular seat frame, including lateral front and rear support members joined by longitudinal left and right support members;

(b) left and right pairs of equal-length, longitudinally spaced-apart, vertical seat supports, each seat support having a lower end attached to the rear skid plate and an opposite, upper end, said upper ends of said left and right pairs being attached to the longitudinal left and right seat frame support members, respectively;

(c) an arm rest assembly, including
  (1) left and right pairs of equal-length, longitudinally spaced-apart, vertical arm rest supports, each arm rest support having a lower end attached to the seat frame and an opposite, upper end; and
  (2) left and right arm rests extending between the upper ends of said left and right pairs of vertical arm rest supports, respectively, at least one of said arm rests being removable to facilitate entry to and exit from the vehicle; and (d) left and right back supports, each back support having a lower end attached to a lateral rear member of the seat frame, and an opposite, free upper end.

9. The vehicle of claim 8, further comprising:
(a) a horizontal seat panel removably attached to and resting upon the seat frame, said seat panel extending laterally outward over the track mechanisms;
(b) a seat cushion that rests upon, and substantially covers, the seat panel, and provides a passenger seating surface; and
(c) a back cushion attached to the back supports.

10. The vehicle of claim 8, wherein the seat assembly further includes:
(a) a seat suspension system resting on the seat frame, said seat suspension system comprising:
  (1) parallel upper and lower air bladder support plates, and
  (2) a plurality of horizontally spaced-apart, inflatable air bladders resting upon and attached to an upper surface of the lower air bladder support plate and attached to a lower surface of the upper bladder support plate;
(b) left and right pairs of equal-length, spaced-apart, vertical seat supports, each seat support having a lower end attached to the rear skid plate and an opposite, upper end, said upper ends of said left and right pairs being attached to left and right side portions of the air bladder support plate, respectively;
(c) an arm rest assembly, including
  (1) left and right pairs of equal-length, longitudinally spaced-apart, vertical arm rest supports, each arm rest support having a lower end attached to a seat frame lateral support member and an opposite, upper end; and
  (2) left and right arm rests extending between said left and right pairs of vertical arm rest supports, respectively, at least one of said arm rests being removable to facilitate entry to and exit from the vehicle;
(d) left and right back supports, each back support having a lower end attached to a lateral rear member of the seat frame, and an opposite, free upper end;
(e) a seat cushion that rests upon the upper air bladder support plate; and
(f) a back cushion attached to the back supports.

11. The vehicle of claim 10, wherein the seat suspension system includes
left and right front air bladders jointly inflatable by means of a first bladder air hose interconnecting the same;
left and right rear air bladders jointly inflatable by means of a second bladder air hose interconnecting the same; and
an inflatable central air bladder disposed intermediate the front and rear air bladders;
whereby the longitudinal pitch of the seat cushion can be varied by adjusting the air pressures within said air bladders.

12. The vehicle of claim 7, wherein the motor mount assembly comprises:
(a) upstanding, apertured, left and right motor mount lugs attached to a rear portion of the underframe;
(b) left and right motor mounts, each motor mount including
  (1) a lower bracket portion attached to a motor mount lug and having a vertical, height adjustment slot;
  (2) integral with said lower bracket portion and extending upward therefrom, an upper bracket portion having first, second and third apertures for receiving the shaft, forward drive port, and reverse drive port of said hydraulic motor, respectively, said upper bracket portion being adapted for supporting a hydraulic motor with the shaft thereof oriented laterally outward of the underframe;
  (3) a height adjustment bolt inserted through each motor mount lug and through the height adjustment slot of the motor mount attached thereto, said bolt being fitted with a wing nut for securing the motor mount at a desired height; and
(c) a laterally disposed, horizontal tie bar extending from the lower bracket of the right motor mount to the lower bracket portion of the left motor mount and attached to each said lower bracket portion;
whereby the position of a hydraulic motor in each of said motor mounts is vertically adjustable for achieving a desired tension in the endless belts.

13. The vehicle of claim 7, wherein each track mechanism comprises:
an outer rail attached to an inner rail in parallel, laterally outward, spaced relation thereto;
a large front idler disposed between front portions of said outer rail and said inner rail;
a large rear idler disposed between rear portions of said outer rail and said inner rail;
two pairs of longitudinally spaced-apart, small idler wheels disposed in tandem between central portions of said inner rail and said outer rail and between the large front and rear idlers;
means for spring coupling the large front idler to said inner and outer rails;
means for spring coupling the large rear idler to said inner and outer rails; and
means for spring coupling each pair of small idler wheels to said inner and outer rails.

14. The vehicle of claim 13, wherein the means for spring coupling the front and rear large idler wheels to the inner and outer rails each comprises:
(a) a spacer bracket interposed between, and joining, said front and rear portions of the inner rails and outer rails, respectively, said spacer bracket having a laterally-disposed, cylindrical, first spacer shaft, respectively; and
(b) a longitudinally-disposed band spring, said band spring having a first bushing end pivotally circumposed about said spacer shaft and an opposite, second bushing end adapted for rotational mounting of a large idler wheel.

15. The vehicle of claim 14, wherein the means for spring coupling the front and rear large idler wheels to the inner and outer rails each further comprises at least one tension spring connecting said spacer bracket to a portion of said band spring intermediate the first and second ends thereof.

16. The vehicle of claim 14, wherein the means for spring coupling each pair of small idler wheels to the inner rails and the outer rails, comprises:

a laterally-disposed, cylindrical, second spacer shaft interposed between, and attached to, an inner rail and an outer rail; and a pair of longitudinal, oppositely-directed band springs, each of said band springs having first ends joined by a hollow, clindrical bushing pivotally circumposed about said second spacer shaft, and each of said band springs having an opposite, free second end adapted for rotational mounting of a small idler wheel.

17. The vehicle of claim 16, wherein each means for spring coupling each pair of small idler wheels to the inner rails and the outer rails further comprises a tension spring connecting said second ends of said oppositely-directed band springs.

18. The vehicle of claim 2, further comprising removable, spaced-apart, left and right leg rests extending forwardly from the seating surface and thence downwardly to front left and front right portions of the front skid plate, respectively.

19. The vehicle of claim 1, 2, 3, 4, 5, 6, 7, 8, 9, 10, 11, 12, 13, 14, 15, 16, 17, or 18, wherein the internal combustion engine has an engine drive shaft fitted with an engine shaft pulley, and further comprising a pump drive assembly mounted on the vehicle and longitudinally spaced apart from the engine, said pump drive assembly including:

a hydraulic pump having a pump driven shaft parallel with the drive shaft of the internal combustion engine;

a pump pulley mounted for rotation with the pump driven shaft; and a drive belt about the engine shaft pulley and the pump pulley for coupling rotation of the engine drive shaft to the pump driven shaft.

20. The vehicle of claim 19, further comprising a steerable, auxiliary wheel system, said system including:

left and right rear wheel assemblies attached to rear portions of the left and right outer rails, and left and right front wheel assemblies attached to front portions of the left and right outer rails, respectively, each of said wheel assemblies having auxiliary wheels that are height adjustable between an upper, retracted position and a lower, ground surface-engaging position;

a steering assembly, comprising a removable steering column having an upper end and an opposite lower end, said upper end being disposed above the seat panel and said lower end being disposed above the front cross member;

a steering wheel attached to the upper end of the steering column and rotatable with said column;

a removable steering column support attached to the seat assembly and in supporting engagement with the steering column intermediate the upper and lower ends of said column; and steering linkage means attached to a lower, front portion of the vehicle for pivoting each of the front auxiliary wheels about a vertical axis displaced laterally inward from the center of said wheel in response to rotations of the steering wheel and steering column;

whereby, in the event the vehicle becomes disabled, the auxiliary wheels can be lowered to the ground surface and the tracks raised above the surface, and the steering assembly can be installed on the vehicle, thereby permitting the vehicle to be steered and rolled on the auxiliary wheels toward a desired destination.

21. The vehicle of claim 20, wherein each of the front and rear wheel assemblies comprises:

a wheel height adjustment block attached to an outer rail, said block having a height adjustment channel;

a wheel mount adapted for vertically reciprocal, sliding contact within the height adjustment channel of said block, said wheel mount having a vertical, threaded bore;

means for rotatably mounting an auxiliary wheel to said wheel mount; and a wheel height adjustment crank having a threaded vertical shaft in threaded engagement with the threaded bore of said wheel mount;

whereby the height of said auxiliary wheel with respect to the vehicle can be adjusted by rotation of said crank.

22. An all terrain vehicle for self-assisted transfers of a disabled passenger between said vehicle and a wheelchair, and for transporting the passenger over a ground surface, comprising:

a longitudinally elongated underframe carried between two track mechanisms, each of said track mechanisms having an endless belt about the same and pivotally mounted idler wheels and a rear drive sprocket in driving engagement with the belt;

a seat assembly centrally disposed above and carried by the underframe and providing a passenger seating surface at least 20 inches but not more than 27 inches above the ground surface, said passenger seating surface extending laterally over each of said track mechanisms;

an electric generator;

an electric storage battery;

an internal combustion engine mounted on the vehicle and in driving engagement with said electric generator;

a voltage regulator connected to the electric power output leads of the electric generator and connected to said electric storage battery;

an electric motor connected to, and powered by said electric storage battery;

a hydraulic pump coupled to and driven by said electric motor;

hydraulic drive means mounted on the vehicle, said hydraulic drive means including hydraulic motors connected by hydraulic conduit to said pump, each of said motors being coupled to said drive sprockets and supported by a motor mount assembly attached to the underframe; and hydraulic drive control means mounted on the vehicle for initiating and controlling forward, reverse, and turning movements of the vehicle over said ground surface.

* * * * *